United States Patent
Eskandarian et al.

(10) Patent No.: US 11,880,833 B2
(45) Date of Patent: Jan. 23, 2024

(54) SYSTEM, METHOD, AND COMPUTER PROGRAM PRODUCT FOR MAINTAINING USER PRIVACY IN GROUP TRANSACTIONS

(71) Applicant: Visa International Service Association, San Francisco, CA (US)

(72) Inventors: Saba Eskandarian, Stanford, CA (US); Payman Mohassel, San Jose, CA (US); Mihai Christodorescu, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 371 days.

(21) Appl. No.: 17/271,679

(22) PCT Filed: Aug. 29, 2019

(86) PCT No.: PCT/US2019/048842
§ 371 (c)(1),
(2) Date: Feb. 26, 2021

(87) PCT Pub. No.: WO2020/047274
PCT Pub. Date: Mar. 5, 2020

(65) Prior Publication Data
US 2021/0192509 A1 Jun. 24, 2021

Related U.S. Application Data

(60) Provisional application No. 62/724,235, filed on Aug. 29, 2018.

(51) Int. Cl.
*G06Q 20/38* (2012.01)
*G06Q 20/10* (2012.01)
(Continued)

(52) U.S. Cl.
CPC ....... *G06Q 20/3829* (2013.01); *G06Q 20/102* (2013.01); *G06Q 20/227* (2013.01);
(Continued)

(58) Field of Classification Search
CPC ............. G06Q 20/3829; G06Q 20/102; G06Q 20/227; G06Q 20/383; H04L 9/008; H04L 9/0861
(Continued)

(56) References Cited

U.S. PATENT DOCUMENTS

| | | | |
|---|---|---|---|
| 7,995,760 B2 * | 8/2011 | Nyberg | H04W 12/50 |
| | | | 713/171 |
| 9,641,332 B1 * | 5/2017 | Yung | H04L 9/30 |

(Continued)

FOREIGN PATENT DOCUMENTS

| | | | | |
|---|---|---|---|---|
| KR | 100943683 B1 | 2/2010 | | |
| WO | 2008109335 A2 | 9/2008 | | |
| WO | WO-2008109335 A2 * | 9/2008 | ............. | G07F 17/32 |

OTHER PUBLICATIONS

Agrawal et al., "Homomorphic MACs: MAC-based Integrity for Network Coding", Applied Cryptography and Network Security, 7th International Conference, 2009, pp. 292-305.
(Continued)

*Primary Examiner* — Courtney P Jones
(74) *Attorney, Agent, or Firm* — The Webb Law Firm

(57) ABSTRACT

Methods are provided for maintaining user privacy, and may include establishing a secret key for communication between a plurality of user devices, the plurality of user devices including a first user device associated with a requesting user and a second user device associated with a second user, wherein at least one server computer does not have access to the secret key; receiving from the first user device, a split-payment request message comprising
(Continued)

encrypted data, the encrypted data included in the split-payment request message encrypted based on the secret key; generating an encrypted balance for the requesting user and the second user based on the encrypted data of the split-payment request message; and transmitting to the second user device, a split-payment confirmation message including the encrypted balance for the requesting user and/or the second user. Systems and computer program products are also provided.

20 Claims, 6 Drawing Sheets

(51) Int. Cl.
    G06Q 20/22    (2012.01)
    H04L 9/00    (2022.01)
    H04L 9/08    (2006.01)
(52) U.S. Cl.
    CPC ........... *G06Q 20/383* (2013.01); *H04L 9/008* (2013.01); *H04L 9/0861* (2013.01)
(58) Field of Classification Search
    USPC .......................................................... 705/71
    See application file for complete search history.

(56) References Cited

U.S. PATENT DOCUMENTS

| | | | | |
|---|---|---|---|---|
| 2014/0180929 A1* | 6/2014 | Ohnishi | ........... | G06Q 20/38215 705/40 |
| 2015/0149344 A1* | 5/2015 | Ananda Kumar | ..... | G06Q 20/14 705/39 |
| 2017/0004468 A1* | 1/2017 | Stroeh | .................... | G06Q 20/29 |

OTHER PUBLICATIONS

Androulaki et al., "Evaluating User Privacy in Bitcoin", Financial Cryptography and Data Security, 17th International Conference, 2013, pp. 34-51.
Angel et al., "PIR with compressed queries and amortized query processing", 2017, pp. 1-18, available: http://eprint.iacr.org/2017/1142.
Angel et al., "Unobservable Communication over Fully Untrusted Infrastructure", 12th USENIX Symposium on Operating Systems Design and Implementation, 2016, pp. 551-569.
Baldimtsi et al., "Anonymous Transferable E-Cash", 18th IACR International Conference on Practice and Theory in Public-Key Cryptography, 2015, pp. 1-24.
Ben-Sasson et al., "Zerocash: Decentralized Anonymous Payments from Bitcoin", 2014 IEEE Symposium on Security and Privacy, 2014, pp. 459-474.
Brakerski et al., "Fully Homomorphic Encryption without Bootstrapping", 2011, pp. 1-27, available: http://eprint.iacr.org/2011/277.
Brands, "Untraceable Off-line Cash in Wallet with Observers", CRYPTO '93, LNCS 773, 1994, pp. 302-318.
Camenisch et al., "Balancing Accountability and Privacy Using E-Cash (Extended Abstract)", Security and Cryptography for Networks, 5th International Conference, 2006, pp. 141-155.
Camenisch et al., "Compact E-Cash", 24th Annual International Conference on the Theory and Applications of Cryptographic Techniques, 2005, pp. 302-321.
Camenisch, "Group Signature Schemes and Payment Systems Based on the Discrete Logarithm Problem", Ph.D. dissertation, ETH Zurich, 1998, pp. 1-189.
Cardtronics, "Health of Cash Study, U.S. Edition", 2017, pp. 1-20, available: http://www.cardtronics.com/landing/healthofcash.aspx.

Chan et al., "Easy Come—Easy Go Divisible Cash", International Conference on the Theory and Application of Cryptographic Techniques, 1998, pp. 1-16.
Chaum, "Blind Signatures for Untraceable Payments", Advances in Cryptology: Proceedings of CRYPTO '82, 1982, pp. 199-203.
Chaum, "Blind Signature System", Advances in Cryptology, Proceedings of CRYPTO '83, 1983, p. 153.
Chaum et al., "Untraceable Electronic Cash", Advances in Cryptology - CRYPTO '88, 8th Annual International Cryptology Conference, 1988, pp. 319-327.
Chen et al., "Simple Encrypted Arithmetic Library—SEAL", Financial Cryptography and Data Security—FC 2017 International Workshops, 2017, pp. 1-16.
Corrigan-Gibbs, "Riposte: An Anonymous Messaging System Handling Millions of Users", 2015 IEEE Symposium on Security and Privacy, 2015, pp. 321-338.
Feige et al., "A Minimal Model for Secure Computation", Proceedings of the Twenty-Sixth Annual ACM Symposium on Theory of Computing, 1994, pp. 554-563.
Gentry, "Fully Homomorphic Encryption Using Ideal Lattices", STOC '09, 2009, pp. 169-178.
Gentry et al., "Homomorphic Encryption from Learning with Errors" Conceptually-Simpler, Asymptotically-Faster, Attribute-Based, 2013, pp. 1-25, available: http://eprint.iacr.org/2013/340.
Goldreich et al., "On the Cryptographic Applications of Random Functions", CRYPTO, 1984, pp. 276-288, available: https://doi.org/10.1007/3-540-39568-7 22.
Goldreich et al., "How to Play Any Mental Game or a Completeness Theorem for Protocols with Honest Majority", Proceedings of the 19th Annual ACM Symposium on Theory of Computing, 1987, pp. 218-229.
Halevi et al., "Secure Computation on the Web: Computing without Simultaneous Interaction", Advances in Cryptology—CRYPTO 2011— 31st Annual Cryptology Conference, 2011, pp. 1-30.
Hooff et al., "Vuvuzela: Scalable Private Messaging Resistant to Traffic Analysis", Proceedings of the 25th Symposium on Operating Systems Principles, 2015, pp. 1-16.
Jedusor, "Mimblewimble", 2016, pp. 1-5, available: http://mimblewimble.org/mimblewimble.txt.
Johnson et al., "Homomorphic Signature Schemes", Topics in Cryptology—CT-RSA 2002, The Cryptographer's Track at the RSA Conference, 2002, pp. 244-262.
Kamara et al., "Outsourcing Multi-Party Computation", IACR Cryptology ePrint Archive, 2011, pp. 1-41.
Kamara et al., "Salus: A System for Server-Aided Secure Function Evaluation", ACM Conference on Computer and Communications Security, pp. 1-26.
Kwon et al., "Atom: Horizontally Scaling Strong Anonymity", Proceedings of the 26th Symposium on Operating Systems Principles, 2017, pp. 406-422.
Maxwell, "Confidential transactions", 2015, pp. 1-6, available: https://people.xiph.org/_greg/confidential values.txt.
Meiklejohn et al., "A Fistful of Bitcoins: Characterizing Payments Among Men with No Names", Proceedings of the 2013 Internet Measurement Conference, 2013, pp. 127-140.
Melara et al., "CONIKS: Bringing Key Transparency to End Users", 24th USENIX Security Symposium, 2015, pp. 1-17.
Nakamoto, "Bitcoin: A Peer-to-Peer Electronic Cash System", 2008, pp. 1-11.
Narula et al., "zkLedger: Privacy-Preserving Auditing for Distributed Ledgers", 15th USENIX Symposium on Networked Systems Design and Implementation, 2018, pp. 65-80.
Okamoto et al., "Disposable Zero-Knowledge Authentications and Their Applications to Untraceable Electronic Cash", Advances in Cryptology—CRYPTO '89, 9th Annual International Cryptology Conference, 1989, pp. 481-496.
Paillier, "Public-Key Cryptosystems Based on Composite Degree Residuosity Classes", Advances in Cryptology—EUROCRYPT '99, International Conference on the Theory and Application of Cryptographic Techniques, 1999, pp. 223-238.

(56) References Cited

OTHER PUBLICATIONS

Pedersen, "Non-Interactive and Information-Theoretic Secure Verifiable Secret Sharing", Advances in Cryptology—CRYPTO '91, 11th Annual International Cryptology Conference, 1991, pp. 129-140.

Pham et al., "PrivateRide: A Privacy-Enhanced Ride-Hailing Service", PoPETs, 2017, pp. 38-56.

Rivest et al., "On Data Banks and Privacy Homomorphisms", Foundations of Secure Computation, Academia Press, 1978, pp. 169-179.

"Spark framework: An expressive web framework for Kotlin and Java", pp. 1-3, available: https://web.archive.org/web/20180825184645/http://sparkjava.com/.

"Splitwise Privacy Policy", 2018, pp. 1-6, available: https://web.archive.org/web/20180626001413///www.splitwise.com/privacy.

Tyagi et al., "Stadium: A Distributed Metadata-Private Messaging System", Proceedings of the 26th Symposium on Operating Systems Principles, 2017, pp. 1-26.

Wust et al., "PRCash: Fast, Private and Regulated Transactions for Digital Currencies", IACR Cryptology ePrint Archive, 2018, p. 1-27.

Yao, "How to Generate and Exchange Secrets (extended abstract)", 27th Annual Symposium on Foundations of Computer Science, 1986, pp. 162-167.

Yao, "Protocols for Secure Computations (extended abstract)", 23rd Annual Symposium on Foundations of Computer Science, 1982, pp. 1-5.

Zhai et al., "AnonRep: Towards Tracking-Resistant Anonymous Reputation", 13th USENIX Symposium on Networked Systems Design and Implementation, NSDI 2016, 2016, pp. 583-596.

\* cited by examiner

A SYSTEM, METHOD, AND COMPUTER PROGRAM PRODUCT FOR MAINTAINING USER PRIVACY IN GROUP TRANSACTIONS

CROSS-REFERENCE TO RELATED APPLICATIONS

This application is the United States national phase of International Application No. PCT/US19/48842 filed Aug. 29, 2019, and claims the benefit of U.S. Provisional Patent Application No. 62/724,235, filed on Aug. 29, 2018, the disclosures of which are hereby incorporated by reference in their entirety.

BACKGROUND

1. Technical Field

The present disclosure relates to payment and transactional systems and, in some non-limiting embodiments or aspects, a system, method, and computer program product for maintaining user privacy in group transactions.

2. Technical Description

Payment splitting applications were developed to address the problem of keeping track of debts between members of a group by providing a convenient interface and bookkeeping system to keep track of communal costs and/or user costs among one or more users of a group of users. Common use cases involve splitting bills for meals among friends or colleagues, splitting the cost of groceries, utilities, and/or rent across roommates, and splitting the cost of events among members of a travel group. A group of individuals may exist for a short term, e.g. a vacation group, or indefinitely (e.g., roommates).

There exist a great number and variety of payment splitting applications, with multiple payment splitting applications having over one million downloads and tens of thousands of positive reviews on the Google Play® app store, for example. Unfortunately, these applications may leak a great deal of private user data to transaction service provider systems associated with one or more individuals in a group. For example, payment splitting applications may permit collection of group names, expense descriptions and amounts, payments and their confirmation numbers, comments and reminders, receipt images, notes, and memos, in addition to any other information attached and/or shared via the application. Additionally, payment splitting applications may permit collection of the types of expenses you add, the features you use, the actions you take, and the time, frequency and duration of your activities.

Currently, there is a need in the art for computer-implemented methods, systems, and computer-program products that are capable of hiding some and/or all transaction data communicated between computing devices so as to increase the security of such communications.

SUMMARY

Accordingly, disclosed are improved systems, methods, and computer-program products for maintaining user privacy in group transactions.

According to some non-limiting embodiments or aspects, provided is a computer-implemented method for maintaining user privacy in group transactions, comprising: establishing, with at least one processor, a secret key for communication between a plurality of user devices, the plurality of user devices comprising a first user device associated with a requesting user and a second user device associated with a second user, wherein at least one server computer does not have access to the secret key; receiving, with the at least one server computer, from the first user device, a split-payment request message comprising encrypted data including a first value and a second value, wherein the encrypted data included in the split-payment request message is encrypted based on the secret key; generating, with the at least one server computer, an encrypted balance for the requesting user and the second user based on the encrypted data of the split-payment request message; and transmitting, with the at least one server computer, to the second user device, a split-payment confirmation message including the encrypted balance for the requesting user and/or the second user.

In some non-limiting embodiments or aspects, the computer-implemented method may include receiving, with the at least one server computer, from the second user device, a split-payment confirmation response message comprising second encrypted data, the second encryption data including an indication that the first value and/or the second value is approved; generating, with the at least one server computer, an updated encrypted balance for the requesting user and the second user based on the encrypted balance for the requesting user and the second user and the second encrypted data of the split-payment confirmation response message; and transmitting, with the at least one server computer, to the first user device, a split-payment response message comprising the updated encrypted balance for the requesting user and the second user.

According to some non-limiting embodiments or aspects, the computer-implemented method may include receiving, with the at least one server computer, from the second user device, a split-payment message comprising a null value associated with a transaction that does not modify the first value and the second value; generating, with the at least one server computer, an updated encrypted balance for the requesting user and the second user based on data of the split-payment confirmation message, wherein the updated encrypted balance does not modify the encrypted balance for the requesting user and the second user; and transmitting, with the at least one server computer, to the first user device, a split-payment response message comprising the updated encrypted balance for the requesting user and the second user In some non-limiting embodiments or aspects, the split-payment confirmation response message may be received after a random interval of time has elapsed from a point in time when the split-payment confirmation message was transmitted to the second user device.

According to some non-limiting embodiments or aspects, generating the encrypted balance for the requesting user and the second user based on the encrypted data of the split-payment request message may include: generating, with the at least one server computer, the encrypted balance for the requesting user and the second user based on the encrypted data of the split-payment request message and an additive homomorphic cryptographic algorithm.

In some non-limiting embodiments or aspects, the computer-implemented method may include generating, with the at least one server computer, at least one checksum value based on the data of the split-payment confirmation message and/or the encrypted balance for the requesting user and the second user; and transmitting, with the at least one server computer, the at least one checksum value to the first user device and/or the second user device.

According to some non-limiting aspects or embodiments, the computer-implemented method may include receiving, with the at least one server computer, from the second user device, a split-payment confirmation response message comprising second encrypted data, the second encrypted data including an indication that the first value and/or the second value is not approved; in response to receiving the indication, generating, with the at least one server computer, an updated encrypted balance for the requesting user and the second user based on the encrypted balance for the requesting user and the second user and the second encrypted data of the split-payment confirmation response message, wherein the updated encrypted balance corresponds to an initial encrypted balance established prior to the generation of the encrypted balance; and transmitting, with the at least one server computer, to the first user device, a split-payment response message comprising the updated encrypted balance for the requesting user and the second user.

According to some non-limiting embodiments or aspects, provided is a system for maintaining user privacy in group transactions comprising at least one processor programmed or configured to: receive, from a first user device associated with a requesting user, a split-payment request message comprising encrypted data associated with a value for a split-payment transaction, the encrypted data included in the split-payment request message encrypted based at least in part on at least one secret key, wherein the at least one secret key is established for communication between a plurality of user devices, and wherein at least one server computer does not have access to the at least one secret key; generate an encrypted balance for at least one responding user of a plurality of responding users based on the encrypted data of the split-payment request message; and transmit at least one split-payment confirmation message to at least one user device of the plurality of user devices, the split-payment confirmation message including the encrypted balance for the requesting user and/or the at least one responding user.

In some non-limiting embodiments or aspects, the at least one processor may be further programmed or configured to: receive, from at least one second user device of the plurality of second user devices, a split-payment confirmation response message comprising second encrypted data, the second encrypted data including an indication that the split-payment transaction is approved by the at least one responding user associated with the encrypted balance; generate an updated encrypted balance for the requesting user and the at least one responding user associated with the encrypted balance that approved the split-payment transaction based on the encrypted balance for the requesting user and the at least one responding user that accepted the split-payment transaction; and transmit, to the first user device, a split-payment response message comprising the updated encrypted balance for the requesting user and/or the at least one responding user that approved the split-payment transaction.

According to some non-limiting embodiments or aspects, the at least one processor may be further programmed or configured to: in response to transmitting the at least one split-payment confirmation message to the at least one user device of the plurality of user devices, receive, from another second user device of the plurality of second user devices, a split-payment message comprising a null value associated with a transaction that does not modify the value for the split-payment transaction, wherein generating the updated encrypted balance for the requesting user and the at least one responding user that approved the split-payment transaction is based on data of the split-payment confirmation message, and wherein, when generating the updated encrypted balance for the requesting user and the at least one responding user that approved the split-payment transaction, the data of the split-payment confirmation message does not cause the at least one processor to modify the encrypted balance for the requesting user and the at least one responding user that accepted the split-payment transaction.

In some non-limiting embodiments or aspects, the split-payment confirmation response message may be received after a random interval of time has elapsed from a point in time when the split-payment confirmation message was transmitted to the at least one user device of the plurality of user devices.

According to some non-limiting embodiments or aspects, when generating the encrypted balance for the at least one responding user of the plurality of responding users based on the encrypted data of the split-payment request message, the at least one processor may be programmed or configured to: generate the encrypted balance for at least one responding user of the plurality of responding users based on the encrypted data of the split-payment request message and an additive homomorphic cryptographic algorithm.

In some non-limiting embodiments or aspects, the at least one processor may be further programmed or configured to: generate at least one checksum value based on the data of the split-payment confirmation message and/or the encrypted balance for the requesting user and the at least one responding user that approved the split-payment transaction; and transmit the at least one checksum to one or more user devices of the plurality of user devices.

According to some non-limiting embodiments or aspects, the at least one processor is further programmed or configured to: receive, from the at least one second user device associated with the at least one responding user, a split-payment confirmation response message comprising second encrypted data, the second encrypted data including an indication that the split-payment transaction is not approved; in response to receiving the indication, generate an updated encrypted balance for the requesting user and the at least one responding user that did not approve the split-payment transaction based on the encrypted balance for the requesting user and the at least one responding user that did not approve the split-payment transaction and the second encrypted data of the split-payment confirmation response message, wherein the updated encrypted balance corresponds to an initial encrypted balance established prior to the generation of the encrypted balance; and transmit, to the first user device, a split-payment response message comprising the updated encrypted balance for the requesting user and the at least one responding user that did not approve the split-payment transaction.

In some non-limiting embodiments or aspects, provided is a computer-program product comprising at least one non-transitory computer-readable medium including one or more instructions that, when executed by at least one processor, cause the at least one processor to: establish at least one secret key for communication between a plurality of user devices, the plurality of user devices comprising a first user device associated with a requesting user and a plurality of second user devices associated with a plurality of responding users, wherein at least one server computer does not have access to the at least one secret key; receive, from the first user device, a split-payment request message comprising encrypted data associated with a value for a split-payment transaction, the encrypted data included in the split-payment request message encrypted based at least in part on the secret key; generate an encrypted balance for at least one responding user of the plurality of responding users based on the encrypted data of the split-payment request message and an additive homomorphic cryptographic algorithm; and transmit at least one split-payment confirmation message to at least one user device of the plurality of user devices, the split-payment confirmation message including the encrypted balance for the requesting user and/or the at least one responding user.

According to some non-limiting embodiments or aspects, the one or more instructions further cause the at least one processor to: receive, from the at least one second user device of the at least one responding user associated with the encrypted balance, a split-payment confirmation response message comprising second encrypted data, the second encrypted data including an indication that the split-payment transaction is approved by the at least one responding user associated with the encrypted balance; generate an updated encrypted balance for the requesting user and the at least one responding user associated with the encrypted balance that approved the split-payment transaction based on the encrypted balance for the requesting user and the at least one responding user that accepted the split-payment transaction; and transmit, to the first user device, a split-payment response message comprising the updated encrypted balance for the requesting user and/or the at least one responding user that approved the split-payment transaction.

In some non-limiting embodiments or aspects, the one or more instructions further cause the at least one processor to: in response to transmitting the at least one split-payment confirmation message to the at least one user device of the plurality of user devices, receive, from another second user device of the plurality of second user devices, a split-payment message comprising a null value associated with a transaction that does not modify the value for the split-payment transaction, wherein generating the updated encrypted balance for the requesting user and the at least one responding user that approved the split-payment transaction is based on data of the split-payment confirmation message, and wherein, when generating the updated encrypted balance for the requesting user and the at least one responding user that approved the split-payment transaction, the data of the split-payment confirmation message does not cause the at least one processor to modify the encrypted balance for the requesting user and the at least one responding user that accepted the split-payment transaction.

According to some non-limiting embodiments or aspects, the split-payment confirmation response message may be received after a random interval of time has elapsed from a point in time when the split-payment confirmation message was transmitted to the at least one user device of the plurality of user devices.

In some non-limiting embodiments or aspects, the one or more instructions further cause the at least one processor to: generate at least one checksum value based on the data of the split-payment confirmation message and/or the encrypted balance for the requesting user and the at least one responding user that approved the split-payment transaction; and transmit the at least one checksum to one or more user devices of the plurality of user devices.

According to some non-limiting embodiments or aspects, the one or more instructions further cause the at least one processor to: receive, from the at least one second user device associated with the at least one responding user, a split-payment confirmation response message comprising second encrypted data, the second encrypted data including an indication that the split-payment transaction is not approved; in response to receiving the indication, generate an updated encrypted balance for the requesting user and the at least one responding user that did not approve the split-payment transaction based on the encrypted balance for the requesting user and the at least one responding user that did not approve the split-payment transaction and the second encrypted data of the split-payment confirmation response message, wherein the updated encrypted balance corresponds to an initial encrypted balance established prior to the generation of the encrypted balance; and transmit, to the first user device, a split-payment response message comprising the updated encrypted balance for the requesting user and the at least one responding user that did not approve the split-payment transaction.

Further non-limiting aspects or embodiments are set forth in the following numbered clauses:

Clause 1: A computer-implemented method, comprising: establishing, with at least one processor, a secret key for communication between a plurality of user devices, the plurality of user devices comprising a first user device associated with a requesting user and a second user device associated with a second user, wherein at least one server computer does not have access to the secret key; receiving, with the at least one server computer, from the first user device, a split-payment request message comprising encrypted data including a first value and a second value, wherein the encrypted data included in the split-payment request message is encrypted based on the secret key; generating, with the at least one server computer, an encrypted balance for the requesting user and the second user based on the encrypted data of the split-payment request message; and transmitting, with the at least one server computer, to the second user device, a split-payment confirmation message including the encrypted balance for the requesting user and/or the second user.

Clause 2: The computer-implemented method of clause 1, further comprising: receiving, with the at least one server computer, from the second user device, a split-payment confirmation response message comprising second encrypted data, the second encryption data including an indication that the first value and/or the second value is approved; generating, with the at least one server computer, an updated encrypted balance for the requesting user and the second user based on the encrypted balance for the requesting user and the second user and the second encrypted data of the split-payment confirmation response message; and transmitting, with the at least one server computer, to the first user device, a split-payment response message comprising the updated encrypted balance for the requesting user and the second user.

Clause 3: The computer-implemented method of clauses 1 or 2, further comprising: receiving, with the at least one server computer, from the second user device, a split-payment message comprising a null value associated with a transaction that does not modify the first value and the second value; generating, with the at least one server computer, an updated encrypted balance for the requesting user and the second user based on data of the split-payment confirmation message, wherein the updated encrypted balance does not modify the encrypted balance for the requesting user and the second user; and transmitting, with the at least one server computer, to the first user device, a split-payment response message comprising the updated encrypted balance for the requesting user and the second user.

Clause 4: The computer-implemented method of any of clauses 1-3, wherein the split-payment confirmation response message is received after a random interval of time has elapsed from a point in time when the split-payment confirmation message was transmitted to the second user device.

Clause 5: The computer-implemented method of any of clauses 1-4, wherein generating the encrypted balance for the requesting user and the second user based on the encrypted data of the split-payment request message comprises: generating, with the at least one server computer, the encrypted balance for the requesting user and the second user based on the encrypted data of the split-payment request message and an additive homomorphic cryptographic algorithm.

Clause 6: The computer-implemented method of any of clauses 1-5, further comprising: generating, with the at least one server computer, at least one checksum value based on the data of the split-payment confirmation message and/or the encrypted balance for the requesting user and the second user; and transmitting, with the at least one server computer, the at least one checksum value to the first user device and/or the second user device.

Clause 7: The computer-implemented method of any of clauses 1-6, further comprising: receiving, with the at least one server computer, from the second user device, a split-payment confirmation response message comprising second encrypted data, the second encrypted data including an indication that the first value and/or the second value is not approved; in response to receiving the indication, generating, with the at least one server computer, an updated encrypted balance for the requesting user and the second user based on the encrypted balance for the requesting user and the second user and the second encrypted data of the split-payment confirmation response message, wherein the updated encrypted balance corresponds to an initial encrypted balance established prior to the generation of the encrypted balance; and transmitting, with the at least one server computer, to the first user device, a split-payment response message comprising the updated encrypted balance for the requesting user and the second user.

Clause 8: A system, comprising: at least one processor programmed or configured to: receive, from a first user device associated with a requesting user, a split-payment request message comprising encrypted data associated with a value for a split-payment transaction, the encrypted data included in the split-payment request message encrypted based at least in part on at least one secret key, wherein the at least one secret key is established for communication between a plurality of user devices, and wherein at least one server computer does not have access to the at least one secret key; generate an encrypted balance for at least one responding user of a plurality of responding users based on the encrypted data of the split-payment request message; and transmit at least one split-payment confirmation message to at least one user device of the plurality of user devices, the split-payment confirmation message including the encrypted balance for the requesting user and/or the at least one responding user.

Clause 9: The system of clause 8, wherein the at least one processor is further programmed or configured to: receive, from at least one second user device of the plurality of second user devices, a split-payment confirmation response message comprising second encrypted data, the second encrypted data including an indication that the split-payment transaction is approved by the at least one responding user associated with the encrypted balance; generate an updated encrypted balance for the requesting user and the at least one responding user associated with the encrypted balance that approved the split-payment transaction based on the encrypted balance for the requesting user and the at least one responding user that accepted the split-payment transaction; and transmit, to the first user device, a split-payment response message comprising the updated encrypted balance for the requesting user and/or the at least one responding user that approved the split-payment transaction.

Clause 10: The system of clauses 8 or 9, wherein the at least one processor is further programmed or configured to: in response to transmitting the at least one split-payment confirmation message to the at least one user device of the plurality of user devices, receive, from another second user device of the plurality of second user devices, a split-payment message comprising a null value associated with a transaction that does not modify the value for the split-payment transaction, wherein generating the updated encrypted balance for the requesting user and the at least one responding user that approved the split-payment transaction is based on data of the split-payment confirmation message, and wherein, when generating the updated encrypted balance for the requesting user and the at least one responding user that approved the split-payment transaction, the data of the split-payment confirmation message does not cause the at least one processor to modify the encrypted balance for the requesting user and the at least one responding user that accepted the split-payment transaction.

Clause 11: The system of any of clauses 8-10, wherein the split-payment confirmation response message is received after a random interval of time has elapsed from a point in time when the split-payment confirmation message was transmitted to the at least one user device of the plurality of user devices.

Clause 12: The system of any of clauses 8-11, wherein, when generating the encrypted balance for the at least one responding user of the plurality of responding users based on the encrypted data of the split-payment request message, the at least one processor is programmed or configured to: generate the encrypted balance for at least one responding user of the plurality of responding users based on the encrypted data of the split-payment request message and an additive homomorphic cryptographic algorithm.

Clause 13: The system of any of clauses 8-12, wherein the at least one processor is further programmed or configured to: generate at least one checksum value based on the data of the split-payment confirmation message and/or the encrypted balance for the requesting user and the at least one responding user that approved the split-payment transaction; and transmit the at least one checksum to one or more user devices of the plurality of user devices.

Clause 14: The system of any of clauses 8-13, wherein the at least one processor is further programmed or configured to: receive, from the at least one second user device associated with the at least one responding user, a split-payment confirmation response message comprising second encrypted data, the second encrypted data including an indication that the split-payment transaction is not approved; in response to receiving the indication, generate an updated encrypted balance for the requesting user and the at least one responding user that did not approve the split-payment transaction based on the encrypted balance for the requesting user and the at least one responding user that did not approve the split-payment transaction and the second encrypted data of the split-payment confirmation response message, wherein the updated encrypted balance corresponds to an initial encrypted balance established prior to the generation of the encrypted balance; and transmit, to the first user device, a split-payment response message comprising the updated encrypted balance for the requesting user and the at least one responding user that did not approve the split-payment transaction.

Clause 15: A computer-program product comprising at least one non-transitory computer-readable medium including one or more instructions that, when executed by at least one processor, cause the at least one processor to: establish at least one secret key for communication between a plurality of user devices, the plurality of user devices comprising a first user device associated with a requesting user and a plurality of second user devices associated with a plurality of responding users, wherein at least one server computer does not have access to the at least one secret key; receive, from the first user device, a split-payment request message comprising encrypted data associated with a value for a split-payment transaction, the encrypted data included in the split-payment request message encrypted based at least in part on the secret key; generate an encrypted balance for at least one responding user of the plurality of responding users based on the encrypted data of the split-payment request message and an additive homomorphic cryptographic algorithm; and transmit at least one split-payment confirmation message to at least one user device of the plurality of user devices, the split-payment confirmation message including the encrypted balance for the requesting user and/or the at least one responding user.

Clause 16: The computer-program product of clause 15, wherein the one or more instructions further cause the at least one processor to: receive, from the at least one second user device of the at least one responding user associated with the encrypted balance, a split-payment confirmation response message comprising second encrypted data, the second encrypted data including an indication that the split-payment transaction is approved by the at least one responding user associated with the encrypted balance; generate an updated encrypted balance for the requesting user and the at least one responding user associated with the encrypted balance that approved the split-payment transaction based on the encrypted balance for the requesting user and the at least one responding user that accepted the split-payment transaction; and transmit, to the first user device, a split-payment response message comprising the updated encrypted balance for the requesting user and/or the at least one responding user that approved the split-payment transaction.

Clause 17: The computer-program product of clauses 15 or 16, wherein the one or more instructions further cause the at least one processor to: in response to transmitting the at least one split-payment confirmation message to the at least one user device of the plurality of user devices, receive, from another second user device of the plurality of second user devices, a split-payment message comprising a null value associated with a transaction that does not modify the value for the split-payment transaction, wherein generating the updated encrypted balance for the requesting user and the at least one responding user that approved the split-payment transaction is based on data of the split-payment confirmation message, and wherein, when generating the updated encrypted balance for the requesting user and the at least one responding user that approved the split-payment transaction, the data of the split-payment confirmation message does not cause the at least one processor to modify the encrypted balance for the requesting user and the at least one responding user that accepted the split-payment transaction.

Clause 18: The computer-program product of any of clauses 15-17, wherein the split-payment confirmation response message is received after a random interval of time has elapsed from a point in time when the split-payment confirmation message was transmitted to the at least one user device of the plurality of user devices.

Clause 19: The computer-program product of any of clauses 15-18, wherein the one or more instructions further cause the at least one processor to: generate at least one checksum value based on the data of the split-payment confirmation message and/or the encrypted balance for the requesting user and the at least one responding user that approved the split-payment transaction; and transmit the at least one checksum to one or more user devices of the plurality of user devices.

Clause 20: The computer-program product of any of clauses 15-19, wherein the one or more instructions further cause the at least one processor to: receive, from the at least one second user device associated with the at least one responding user, a split-payment confirmation response message comprising second encrypted data, the second encrypted data including an indication that the split-payment transaction is not approved; in response to receiving the indication, generate an updated encrypted balance for the requesting user and the at least one responding user that did not approve the split-payment transaction based on the encrypted balance for the requesting user and the at least one responding user that did not approve the split-payment transaction and the second encrypted data of the split-payment confirmation response message, wherein the updated encrypted balance corresponds to an initial encrypted balance established prior to the generation of the encrypted balance; and transmit, to the first user device, a split-payment response message comprising the updated encrypted balance for the requesting user and the at least one responding user that did not approve the split-payment transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

DETAILED DESCRIPTION

Figure 1:
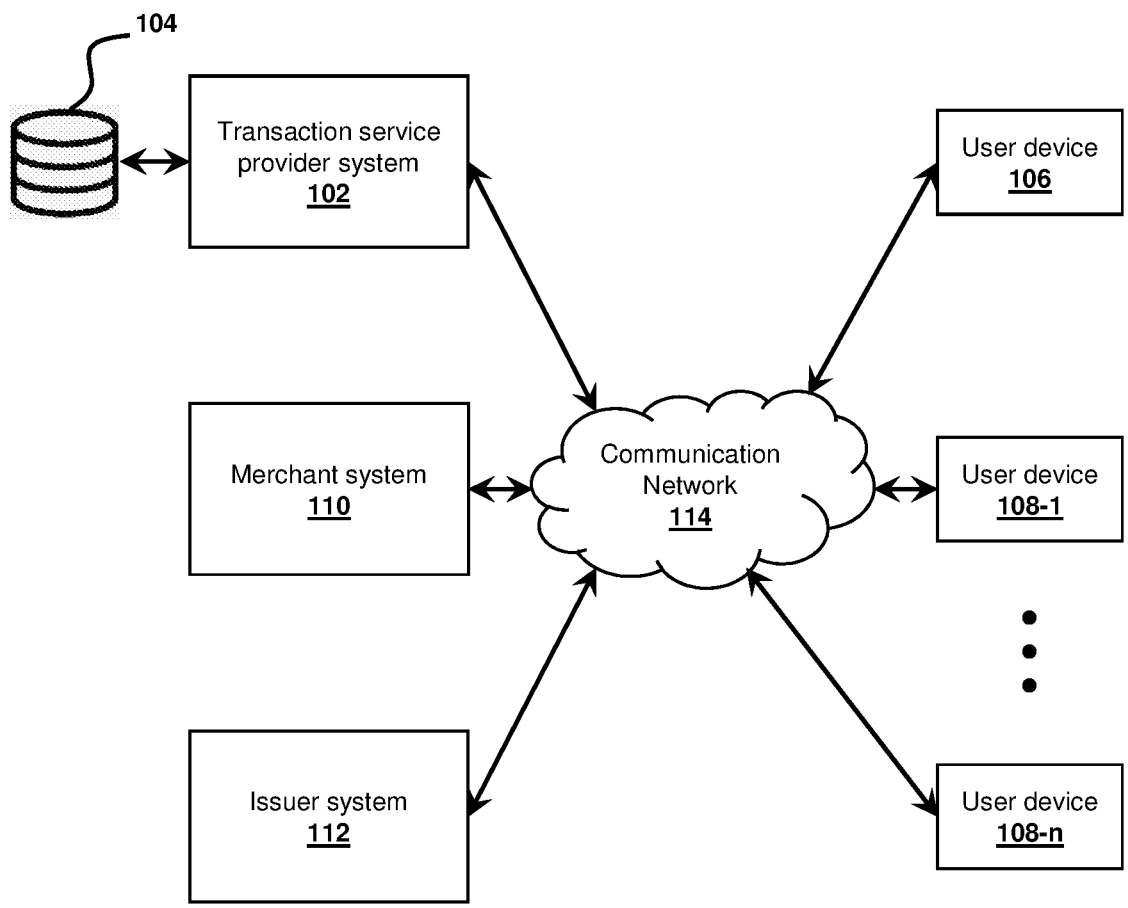
FIG. 1 is a diagram of a non-limiting aspect or embodiment of a system for maintaining user privacy in group transactions.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions such as such as credit payment transactions and/or debit payment transactions. For example, an issuer institution may provide an account identifier, such as a primary account number (PAN), to a customer that uniquely identifies one or more accounts associated with that customer. In some non-limiting embodiments or aspects, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "account identifier" may include one or more types of identifiers associated with an account (e.g., a PAN associated with an account, a card number associated with an account, a payment card number associated with an account, a token associated with an account, and/or the like). In some non-limiting embodiments or aspects, an issuer may provide an account identifier (e.g., a PAN, a token, and/or the like) to a user (e.g., an account holder) that uniquely identifies one or more accounts associated with that user. The account identifier may be embodied on a payment device (e.g., a physical instrument used for conducting payment transactions, such as a payment card, a credit card, a debit card, a gift card, and/or the like) and/or may be electronic information communicated to the user that the user may use for electronic payment transactions. In some non-limiting embodiments or aspects, the account identifier may be an original account identifier, where the original account identifier was provided to a user at the creation of the account associated with the account identifier. In some non-limiting embodiments or aspects, the account identifier may be a supplemental account identifier, which may include an account identifier that is provided to a user after the original account identifier was provided to the user. For example, if the original account identifier is forgotten, stolen, and/or the like, a supplemental account identifier may be provided to the user. In some non-limiting embodiments or aspects, an account identifier may be directly or indirectly associated with an issuer institution such that an account identifier may be a token that maps to a PAN or other type of account identifier. Account identifiers may be alphanumeric, any combination of characters and/or symbols, and/or the like.

As used herein, the term "token" may refer to an account identifier of an account that is used as a substitute or replacement for another account identifier, such as a PAN. Tokens may be associated with a PAN or other original account identifier in one or more data structures (e.g., one or more databases) such that they may be used to conduct a payment transaction without directly using an original account identifier. In some non-limiting embodiments or aspects, an original account identifier, such as a PAN, may be associated with a plurality of tokens for different individuals or purposes. In some non-limiting embodiments or aspects, tokens may be associated with a PAN or other account identifiers in one or more data structures such that they can be used to conduct a transaction without directly using the PAN or the other account identifiers. In some examples, an account identifier, such as a PAN, may be associated with a plurality of tokens for different uses or different purposes.

As used herein, the term "merchant" may refer to one or more entities (e.g., operators of retail businesses) that provide goods, services, and/or access to goods and/or services, to a user (e.g., a customer, a consumer, and/or the like) based on a transaction such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "point-of-sale (POS) device" may refer to one or more electronic devices, which may be used by a merchant to conduct a transaction (e.g., a payment transaction) and/or process a transaction. Additionally or alternatively, a POS device may include peripheral devices, card readers, scanning devices (e.g., code scanners and/or the like), Bluetooth® communication receivers, near-field communication (NFC) receivers, radio frequency identification (RFID) receivers, and/or other contactless transceivers or receivers, contact-based receivers, payment terminals, and/or the like.

As used herein, the term "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the term "transaction service provider" may refer to an entity that receives transaction authorization requests from merchants or other entities and provides guarantees of payment, in some cases through an agreement between the transaction service provider and an issuer institution. In some non-limiting embodiments or aspects, a transaction service provider may include a credit card company, a debit card company, a payment network such as Visa®, MasterCard®, AmericanExpress®, or any other entity that processes transaction. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate payment transactions, such as one or more POS devices used by a merchant. In some non-limiting embodiments or aspects, a client device may include a computing device configured to communicate with one or more networks and/or facilitate payment transactions such as, but not limited to, one or more desktop computers, one or more mobile devices, and/or other like devices.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for maintaining user privacy in group transactions that provide several technical advantages over existing split payment systems and methods. Non-limiting embodiments allow for users to arrange for payments and share payments among themselves without revealing any sensitive personal and/or account information to external parties or systems, including an external server that manages user balances and obligations.

In some non-limiting embodiments or aspects, computer-implemented methods, systems, and computer-program products are provided that hide some and/or all transaction data for a split-payment transaction within a group from a transaction service provider system while providing integrity guarantees against malicious users or even a malicious transaction service provider system. The embodiments or aspects described herein obscures which group member from among one or more group members is requesting and/or giving funds in a transaction, how much is being transferred during the split-payment transaction, when the split-payment transaction occurs, and even whether a split-payment transaction has happened at all. The transaction service provider system may learn and/or be able to determine only the constitution of each group and nothing more. Moreover, the computer-implemented methods, systems, and computer-program products described herein may ensure that neither a malicious user (e.g., a user device associated with a malicious user) nor the transaction service provider system itself can alter balances, frame other users for charges, or otherwise tamper with the split-payment transaction. The security of the computer-implemented methods, systems, and computer-program products described herein relies only on the assumption that AES is secure, and the server-side computation requires no cryptographic operations, only arithmetic operations on 128-bit integers.

In some non-limiting embodiments or aspects, groups of users may establish and share a secret key and a communication protocol for advancing a split-payment transaction in rounds. In each round, users may send, via respective user devices, either split-payment transaction data or cover traffic to a transaction service provider system that is facilitating communication of the respective user devices. In either case, at a high level, messages transmitted form each user device may include a vector of length N, where N is the group size, each cell of which may include a 128-bit integer representing a charge that the user associated with the user device sending the split-payment transaction data wants to make to each other user of the group. The values themselves may be masked with a pseudorandom value generated with AES. In some non-limiting embodiments or aspects, additional restrictions may be placed on the structure and content of messages that allow a transaction service provider system to blindly update balances and check that no user has attempted to tamper unfairly with its own or others' balances.

Finally, the embodiments and/or aspects described herein can leverage techniques similar to those of homomorphic MACs to very efficiently transform our scheme from one that assumes a semihonest server to one secure against a fully malicious server without increasing bandwidth per round or modifying the server's per-round computation in any way. For realistic group sizes of up to twenty-five users per group each round may perform one or more steps in fewer than fifty milliseconds per round of computation on a user device and the transaction service provider system may perform one or more steps in fewer than three-hundred microseconds per round for each group, meaning that the embodiments described herein may enjoys excellent performance and scalability properties. Bandwidth requirements may also light, at under 500 Bytes of communication between a client and the server in each round.

Multiple messages may be communicated between user devices during one or more rounds of communication. For example, after a requesting user requests funds from one or more responding users of a group, each user device may communicate messages representing a split-payment transaction and/or may communicate messages including a zero or null value representing cover traffic (e.g., traffic intended to obscure messages that include details about the split-payment transaction if intercepted at the central server and/or if the central server is attempting to intercept or compromise the split-payment transaction). By virtue of the configurations described herein, communications between each user device may preserve anonymity, since intercepting one or even a subset of messages communicated between user devices may not enable the intercepting party to determine the details of the split-payment transaction. Additionally, by virtue of the embodiments and aspects described herein, the amount of computational resources needed at the central server to facilitate communication between user devices during the split-payment transaction may be reduced (e.g., certain computations may be distributed across the user devices, and/or the like).

Referring now to FIG. 1, illustrated is a diagram of a system 100 for maintaining user privacy in group transactions. As shown in FIG. 1, system 100 includes transaction service provider system 102, database 104, user device 106, user devices 108-1-108-n, merchant system 110, and issuer system 112. Transaction service provider system 102, database 104, user device 106, user devices 108-1-108-n, merchant system 110, and issuer system 112 may interconnect (e.g., establish a connection to communicate and/or the like) via wired connections, wireless connections, or a combination of wired and wireless connections.

Transaction service provider system 102 may include one or more devices capable of being in communication with database 104, user device 106, user device 108, merchant system 110, and/or issuer system 112. For example, transaction service provider system 102 may include one or more computing devices, such as a server, a group of servers, and/or other like computing devices. In some non-limiting embodiments or aspects, transaction service provider system 102 may be associated with a transaction service provider and/or a payment gateway service provider as described herein. Transaction service provider system 102 may include and/or be capable of communicating with database 104. In some non-limiting examples, the transaction service provider system 102 may serve solely as a split payment platform to facilitate a transaction between users. In other examples, the transaction service provider system 102 may also process and settle transactions.

User device 106 may include one or more devices capable of being in communication with transaction service provider system 102, database 104, user device 108, merchant system 110, and/or issuer system 112. For example, user device 106 may include one or more payment devices and/or one or more computing devices such as one or more mobile devices. In some non-limiting embodiments or aspects, user device 108 may communicate via a short-range wireless communication connection (e.g., a wireless communication for communicating information, such as a NFC connection, a Bluetooth® communication, and/or the like). In some non-limiting embodiments or aspects, user device 106 may be associated with a user. For example, user device 106 may be associated with a requesting user that is requesting that a split-payment transaction be approved by one or more other users (e.g., one or more responding users). In some non-limiting embodiments or aspects, user device 106 may refer to one or more user devices 106-1-106-n associated with one or more users, the one or more user devices 106-1-106-n referred to collectively as user device 106.

User device 108 may include one or more devices capable of being in communication with transaction service provider system 102, database 104, user device 106, merchant system 110, and/or issuer system 112. For example, user device 108 may include one or more payment devices and/or one or more computing devices such as one or more mobile devices. In some non-limiting embodiments or aspects, user device 108 may communicate via a short-range wireless communication connection. In some non-limiting embodiments or aspects, user device 108 may be associated with a user. For example, user device 108 may be associated with a responding user that is responding to a request from a requesting user indicating that a split-payment transaction is approved or not approved (e.g., modified, declined, and/or the like). In some non-limiting embodiments or aspects, user device 108 may refer to one or more user devices 108-1-108-n associated with one or more users, the one or more user devices 108-1-108-n referred to collectively as user device 108.

Merchant system 110 may include one or more devices capable of being in communication with transaction service provider system 102, database 104, user device 106, user device 108, and/or issuer system 112. For example, merchant system 110 may include one or more computing devices, such as a server, a group of servers, and/or other like computing devices. In some non-limiting embodiments or aspects, merchant system 110 may be associated with a merchant as described herein.

Issuer system 112 may include one or more devices capable of being in communication with transaction service provider system 102, database 104, user device 106, user device 108, and/or merchant system 110. For example, issuer system 112 may include one or more computing devices, such as a server, a group of servers, and/or other like computing devices. In some non-limiting embodiments or aspects, issuer system 112 may be associated with an issuer as described herein.

Communication network 114 may include one or more wired and/or wireless networks. For example, communication network 114 may include a cellular network (e.g., a long-term evolution (LTE) network, a third generation (3G) network, a fourth generation (4G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of some or all of these or other types of networks.

The number and arrangement of systems, devices, and networks shown in FIG. 1 are provided as an example. There may be additional systems, devices and/or networks, fewer systems, devices, and/or networks, different systems, devices and/or networks, or differently arranged systems, devices, and/or networks than those shown in FIG. 1. Furthermore, two or more systems or devices shown in FIG. 1 can be implemented within a single system or a single device, or a single system or a single device shown in FIG. 1 can be implemented as multiple, distributed systems or devices. Additionally or alternatively, a set of systems or a set of devices (e.g., one or more systems, one or more devices) of system 100 may perform one or more functions described as being performed by another set of systems or another set of devices of system 100.

A split-payment transaction that is performed in accordance with one or more methods described herein may allow one or more users to establish a group of users operating one or more user devices of user device 106 and/or user devices 108-1-108-n, exchange charges with one another in the group of users, reject unwanted charges from one another in the group of users, and settle the group balance. For any transaction, a central server (e.g., a transaction service provider system) does not have access to information about split-payment transactions (e.g., the identity of the users in the group of users involved in the split-payment transaction, how much is spent in the split-payment transaction by group of users in the group of users, and/or the like) or information from which such knowledge could be derived. Information about the group of users involved in the split-payment transaction are hidden from the central server. In this manner, users in the group of users are unable to take advantage of the privacy schema to manipulate balances (e.g., to create money for himself/herself) or otherwise maliciously tamper with balances during the split-payment transaction. Additionally, such systems and methods protect against a malicious server causing the systems and methods described herein to deviate from their correct functionality.

Described herein, a split-payment transaction may allow one or more users to create and add to a group of users, request and reject charges from users in the group of users, and settle one or more balances for the group of users. A trace algorithm may cause one or more computing devices of a system for performing a split-payment transaction to trace which computing device associated with the one or more users has made a payment request. Additionally, submission of an identical request in the opposite direction (e.g., for a value inverse such as $1, where −$1 was requested) may be determined to be a rejection of the transaction by the user associated with the user device (e.g., user device 106 or one of user devices 108-1-108-n) that submitted the identical request in the opposite direction. When the logic of the algorithms described herein are properly implemented, systems and methods as described herein may provide the same interface to the user of a private payment-splitting application as one that has a built-in rejection operation.

A split-payment transaction involving transaction service provider system 102, and one or more users operating one or more user devices (e.g., user device 106 and/or user device 108-1-108-n) may be configured to execute stateful protocols (e.g., one or more operations in which information is maintained after a transaction is processed). These stateful protocols may include, without limitation, "Setup", "Join", "Request", "Trace", and/or "Settle". In some non-limiting embodiments or aspects, in each stateful protocol, transaction service provider system 102 may communicate with user device 106 and/or user devices 108-1-108-n, but user devices 108-1-108-n may not be configured to communicate with one another directly. For example, in a setup operation, transaction service provider system 102 may be configured to receive a secret key (e.g., one or more public/private key pairs, symmetrical keys, and/or the like), for a group of size N and parameters pp such as, without limitation, the identity of an individual user of a group, and generate a new split-payment transaction including a group of users. In such an example, the balance of each user may be set to zero. In another example, in a join operation, transaction service provider system 102 may be configured to add a new user to a group of users involved in a split-payment transaction and update the group parameters of the split-payment transaction to reflect the addition of the new user to the group of users. In such an example, transaction service provider system 102 may be configured to provide, as output based on a group identifier ("gid") and one or more parameters, a gid of the updated group or ⊥ if the resulting group is invalid. In a request operation, transaction service provider system 102 may be configured to receive a gid, as well as parameters l,j,v, where v is associated with units of currency transferred from a balance of user i to a balance of user j within the group associated with the gid. In the request operation, transaction service provider system 102 may be configured to provide either a gid or ⊥ if there was a failure and no change was made to one or more balances associated with one or more users. In a trace operation, transaction service provider system 102 may be configured to receive a gid during a transaction associated with a transaction identifier ("tid") and an identifier of a user j, and provide, as output, the identity of the user who made a charge to user j in group gid during the transaction tid, if any. Finally, in a settle operation (e.g., a settlement process), transaction service provider system 102 may be configured to receive a gid and provide, as output, a vector p of the values where $p_i$ represents the amount owed by/to the i-th member of group gid. In such an example, transaction service provider system 102 may provide, as output, ⊥ if an invalid gid is provided to transaction service provider system 102. Although transaction service provider system 102 may provide a matrix indicating the identity of one or more users that should pay rather than a vector indicating credits and/or debits that occurred as a result of a split-payment transaction, the one or more user devices 106 and/or 108-1-108-*n* requesting the vector may be configured to derive such a matrix based on the vector returned by transaction service provider system 102.

In some non-limiting embodiments or aspects, the systems and methods described herein maintain an accurate running balance of debts between group members after each operation is performed such that the originator of each transaction involved in a split-payment transaction can be traced. Each operation may be defined in terms of how it affects the result of running a settle operation on a targeted group.

In some non-limiting embodiments or aspects, a payment scheme may be correct if the payment scheme satisfies the following properties when all parties behave honestly: for a given positive integer N and valid secret key (e.g., including public key pk and/or secret key sk) provided to transaction service provider system 102 as input, transaction service provider system 102 provides as output of a setup operation (which, takes as input, sk, pk, N, pp, and/or $\lambda$), a gid such that for a settle operation performed based on the gid, transaction service provider system 102 provides a zero vector of length N. In some non-limiting embodiments or aspects, for a given valid gid associated with a group of size N, the following pseudocode, when executed by transaction service provider system 102 and/or user device 106 or a user device of user device 108-1-108-*n*, provides as output a zero-value vector (e.g., a null vector) of length N+1:

P←Settle(gid)
Join(gid,pp)
P'←F Settle(gid)
return p'-(p||0).

Given a valid gid associated with a group of users of size N, where $0 < i,j \leq N$, the following pseudocode, when executed by transaction service provider system 102 and/or 108-1-108-*n*, provides a vector of length N with the value v in position i, the value −v in position j, and zero (e.g., the value of zero or a null value) elsewhere:

p←F Settle(gid)
Request(gid, i, j, v)
p'←F Settle(gid)
return p'-p.

In some non-limiting embodiments or aspects, where tid reduces the balance of the jth position of the vector returned by Settle(gid), then i* and v* are associated with the values used as parameters in the operation Request(gid, i*, j, v*) that produced tid, and otherwise $i^* = \bot \cdot v^* = 0$.

In non-limiting embodiments, the systems and methods described herein are configured to expose to transaction service provider system 102 only group membership information and does not expose any details of the users associated with user device 106 and/or user devices 108-1-108-*n* such as quantities, frequencies, and/or the like. This may be formalized with a security game where no central server is enabled to distinguish between two transactions including a combination of Join and Request operations for a given group. For example, the systems and methods described herein may protect against an adversary who eavesdrops on the network or controls users in other groups in addition to the central server itself.

In some non-limiting embodiments or aspects, in a privacy experiment PRIV[A, $\lambda$, b] with security parameter A played between an adversary A who plays the role of the central server and a challenger C who is given an input b and plays the honest user $U_1 \ldots U_N$, the following scenario may occur. First, Adversary A may pick values N, pp, and challenger C may pick pk, sk. Both may cause transaction service provider system 102 to perform a setup operation based on these values and receive an output gid from transaction service provider system 102. Next, A may send to C two transcripts $t_0$, and $t_1$, where $|t_0|=|t_1|$, and where each transcript includes a combination of operations that may be performed by a group of user devices made in the same order, but possibly with different parameters. Afterward, C may interact with A to carry out the list of operations specified by transcript $t_b$. As a result, A may output a bit b'. PRIV[A, $\lambda$, b] may output the value b' returned by A at the end of the privacy experiment. As described herein, communications between transaction service provider system 102 and user devices 106, 108-1-108-*n* may be private where transaction service provider system 102 does not know one or more of which users and/or user devices 106, 108-1-108-*n* are involved in a split-payment transaction, the amount of funds being transferred during the split-payment transaction, whether charges were rejected, and/or the like.

In some non-limiting embodiments or aspects, a payment scheme P may be a private scheme if no Probabilistic Polynomial-Time (PPT) adversary (e.g., a PPT algorithm) can win a privacy experiment with greater than negligible advantage. That is, if the quantity $|\Pr[\text{PRIV}[A, \lambda, 0]=1]-\Pr[\text{PRIV}[A, \lambda, 1]=1 \text{ negl}(\lambda)|$ for any PPT A. Additionally or alternatively, systems and methods described herein may require that groups have integrity, which includes user integrity and server integrity. For example, user integrity may include two properties. The first property may include ensuring that the sum of balances in a group remains at zero after every split-payment transaction, after every round of a split-payment transaction, and/or the like. By verifying that the sum of balances remains at zero, systems as described herein may be configured such that user devices associated with one or more users may not silently corrupt an encrypted balance maintained by transaction service provider system 102. In another example, malicious charges by a user in a group can be rejected or charged back by a user who does not want to pay. However, an attacker is prevented from framing a different group member as an originator of an unwanted charge. As described herein, systems and methods may allow for a payment-splitting scheme to output $\bot$ when an integrity violation has been detected (e.g., by transaction service provider system 102, user device 106, and/or one or more of user devices 108-1-108-*n*).

For example, in a PPT adversary A that corrupts up to N−1 users $U_i$ in a group of size N represented by group identifier gid, a payment-splitting scheme may have user integrity if the following two properties are satisfied except with negligible probability in the security parameter $\lambda$: (1) the operation Settle(gid) returns either $\bot$ or a vector P such that $\Sigma$ for i=1 to N, of $p_i$=0; and (2) the operation Trace(gid,tid,j) for a transaction tid causes transaction service provider system 102 to provide as output either the values required by the definition of correctness or $\bot$.

Server integrity may be facilitated by providing the same views (e.g., information displayed on one or more graphical user interfaces) to user devices 106 and 108-1-108-*n* during a given split-payment transaction, regardless of whether transaction service provider system 102 is operating honestly, arbitrarily, and/or maliciously. To define server integrity, the notion of the view of a party in a payment scheme is first defined. The view $\text{View}_s$ (gid, tid, i) of party $U_i$ in group gid may include the transcript of all messages sent between that party and the central server S in the course of a split-payment transaction associated with tid. In one example, for a potentially malicious PPT server S*, a payment scheme may have server integrity if the payment scheme satisfies the following properties for all users $U_i$, i∈[N], in a group represented by gid except with negligible probability in the security parameter A: either $\text{Settle}_{s^*}(\text{gid})=\text{Settle}_s$ (gid) or $\text{Settle}_{s^*}(\text{gid})=\bot$. In some non-limiting embodiments or aspects, either $\text{Trace}_{s^*}(\text{gid},\text{tid},i)=\text{Traces}(\text{gid},\text{tid},i)$ or $\text{Trace}_{s^*}(\text{gid},\text{tid},i)=\bot$. In some non-limiting embodiments or aspects, for any tid=Request(gid, i, j, v) where the request does not output ⊥, j∈[N], and v∈Z, $\text{View}_{s^*}(\text{gid},\text{tid},i)=\text{View}_s(\text{gid},\text{tid},i)$. In such an example, a scheme which always outputs ⊥ for every operation may satisfy a definition of server integrity, but such a scheme fails to satisfy the correctness properties desired for a payment scheme.

Figure 2:
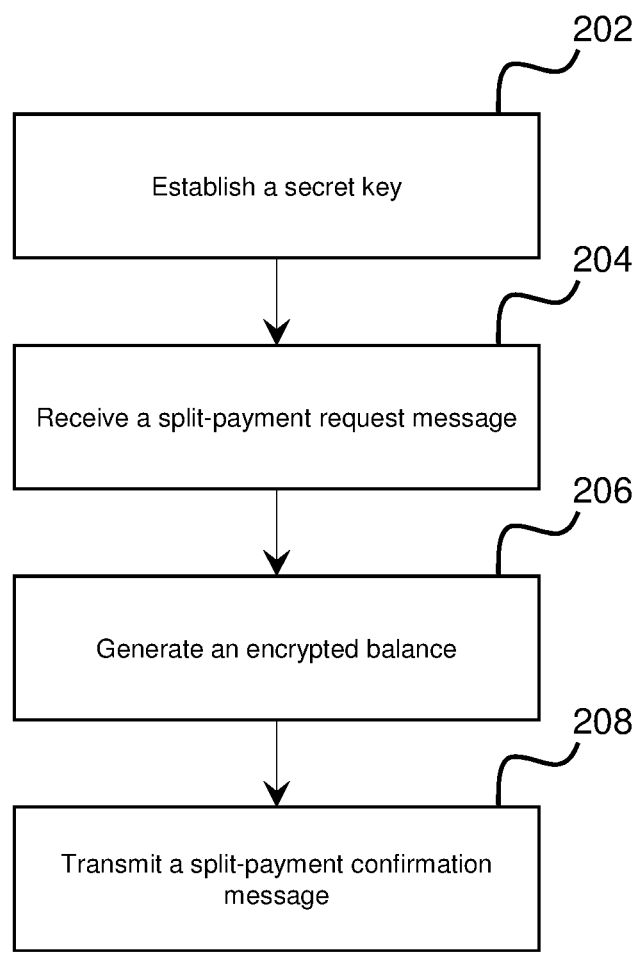
FIG. 2 is a flow diagram of some non-limiting embodiments or aspects of a process for maintaining user privacy in group transactions.

Referring now to FIG. 2, illustrated is a flow diagram of some non-limiting embodiments or aspects of a process 200 for maintaining user privacy in group transactions. In some non-limiting embodiments or aspects, one or more of the functions described with respect to process 200 may be performed (e.g., completely, partially, and/or the like) by transaction service provider system 102, user device 106, and/or user device 108. In some non-limiting embodiments or aspects, one or more of the steps of process 200 may be performed (e.g., completely, partially, and/or the like) by another device and/or another group of devices separate from and/or including transaction service provider system 102, user device 106, and/or user device 108 such as merchant system 110 and/or issuer system 112.

As shown in FIG. 2, at step 202, process 200 may include establishing a secret key. For example, transaction service provider system 102 may communicate with user device 106 and/or user device 108 to establish a secret key for encrypting messages and/or data communicated between user device 106 and user device 108. In some non-limiting embodiments or aspects, the secret key established between user device 106 and user device 108 may be a symmetric encryption key, a pair of asymmetric keys, and/or the like. In some non-limiting embodiments or aspects, user device 106 and user device 108 may establish the secret key by communicating directly with one another. For example, user device 106 and/or user device 108 may communicate directly with one another via communication network 114 and/or a short-range wireless communication connection to establish the secret key. In some non-limiting embodiments or aspects, one or more secret keys may be established between one or more user devices 106 and/or one or more user devices 108. For example, user device 106 may establish a first secret key with a first user device 108 and user device 106 may establish a second secret key with a second user device 108. In such an example, user device 106 may encrypt messages and/or data communicated to the first user device 108 with the first secret key and user device 106 may encrypt messages and/or data communicated to the second user device 108 with the second secret key. In some non-limiting embodiments or aspects, a separate key exchange system may be used to establish a secret key. It will be appreciated that various other arrangements are possible.

In some non-limiting embodiments or aspects, transaction service provider system 102 may not have access to the secret key. For example, transaction service provider system 102 may receive and/or transmit encrypted messages communicated between user device 106 and user device 108, the encrypted messages including data associated with establishing the secret key for encryption and/or decryption of data transmitted and/or received from and/or by user device 106 and user device 108. Accordingly, transaction service provider system 102 may not have access to the secret key and, as such, may not be able to decrypt messages and/or data communicated between user device 106 and user device 108.

As shown in FIG. 2, at step 204, process 200 may include receiving a split-payment request message. For example, transaction service provider system 102 may receive a split-payment request message. In such an example, transaction service provider system 102 may receive the split-payment request message from user device 106 and/or user device 108. In such an example, the split-payment request message may include encrypted data associated with a split-payment transaction. In some non-limiting embodiments or aspects, the encrypted data associated with the split-payment transaction may represent a vector including one or more values. For example, the one or more values of the vector may be associated with one or more amounts of funds for each user involved in the split-payment transaction (e.g., amounts of funds to be credited and/or debited from an account of the respective user, if approved by the respective user).

In some non-limiting embodiments or aspects, transaction service provider system 102 may receive a split-payment request message that is encrypted with the secret key (e.g., the message itself is encrypted with the secret key and/or the message includes data that is encrypted with the secret key). For example, transaction service provider system 102 may receive the split-payment request message from user device 106 and/or user device 108, where the split-payment message is encrypted by user device 106 or user device 108 using the secret key, respectively. In another example, transaction service provider system 102 may receive the split-payment request message from user device 106 and/or user device 108, where encrypted data included in the split-payment request message is encrypted by user device 106 and/or user device 106 using the secret key, respectively. In such an example, the encrypted data encrypted by user device 106 and/or user device 108 may be associated with one or more values (e.g., a value of an amount of funds associated with the user of user device 106 and/or user device 108, the values of one or more other users involved in the split-payment transactions, and/or the like).

As shown in FIG. 2, at step 206, process 200 may include generating an encrypted balance. For example, transaction service provider system 102 may generate an encrypted balance. In such an example, transaction service provider system 102 may generate the encrypted balance for a requesting user (e.g., a first user and/or a second user) associated with user device 106 and/or a responding user (e.g., a second user and/or a first user) associated with user device 108. In some non-limiting embodiments or aspects, transaction service provider system 102 may generate the encrypted balance based on the split-payment request message. For example, transaction service provider system 102 may generate the encrypted balance based on the split-payment request message and/or the encrypted data included in the split payment request message.

In some non-limiting embodiments or aspects, transaction service provider system 102 may generate the encrypted balance without transaction service provider system 102 having access to the secret key. For example, transaction service provider system 102 may generate the encrypted balance based on the split-payment request message, the encrypted data included in the split-payment request message. For example, an additive homomorphic cryptographic algorithm may be used to sum encrypted values.

In some non-limiting embodiments or aspects, transaction service provider system 102 may generate the encrypted balance based on an initial encrypted balance. For example, transaction service provider system 102 may receive initial split-payment transaction data either directly or via a message (e.g., the initial split-payment transaction data may be included in the split-payment request message transmitted by user device 106 to transaction service provider system 102 and/or another message). In some non-limiting embodiments or aspects, transaction service provider system 102 may receive an indication that the split-payment request message is an initial message from user device 106 and, based on receiving the indication, may generate an initial encrypted balance. In some non-limiting embodiments or aspects, the initial encrypted balance may be associated with an initial encrypted balance for one or more users (e.g., one or more requesting users and/or one or more responding users) involved in a split-payment transaction.

In some non-limiting embodiments or aspects, transaction service provider system 102 may receive and/or generate the initial encrypted balance, where the initial encrypted balance is determined based on the additive homomorphic cryptographic algorithm. For example, transaction service provider system 102 may receive and/or generate the initial encrypted balance, where the initial encrypted balance is an encrypted balance and where the values associated with each user involved in the split-payment transaction are set to zero and/or are null, the encrypted balance generated based on the additive homomorphic cryptographic algorithm.

As shown in FIG. 2, at step 208, process 200 may include transmitting a split-payment confirmation message. For example, transaction service provider system 102 may transmit a split-payment confirmation message to user device 108. In some non-limiting embodiments or aspects, transaction service provider system 102 may transmit the split-payment confirmation message to user device 108, where the split-payment confirmation message includes the encrypted balance. For example, transaction service provider system 102 may transmit the split-payment confirmation message to user device 108, where the split-payment confirmation response message includes the encrypted balance for the requesting user and/or the responding user.

In some non-limiting embodiments or aspects, transaction service provider system 102 may receive a split-payment confirmation response message. For example, transaction service provider system 102 may receive a split-payment confirmation response message from user device 108. In some non-limiting embodiments or aspects, transaction service provider system 102 may receive a split-payment confirmation response message from user device 108, where the split-payment confirmation response message includes second encrypted data. As an example, the second encrypted data may include an indication that the split-payment transaction is approved or not approved by the responding user associated with user device 108.

In some non-limiting embodiments or aspects, transaction service provider system 102 may receive a split-payment confirmation response message after a random interval of time has elapsed. For example, transaction service provider system 102 may receive a split-payment confirmation response message after a random interval of time has elapsed from a point in time when the split-payment confirmation message was transmitted to user device 108. In some non-limiting embodiments or aspects, user device 106 and/or user device 108 may determine the random interval of time. For example, to prevent interception of messages during one or more rounds of communication between user device 106 and user device 108, user device 106 and/or user device 108 may transmit messages in response to and/or after a random interval of time from when user device 106 and/or user device 108 receives messages and/or data from transaction service provider system 102.

In some non-limiting embodiments or aspects, the indication included in the second encrypted data may include a vector. For example, the indication included in the second encrypted data may include a vector associated with (e.g., that includes the same value or values) the vector included in the encrypted data from the split-payment confirmation message, thereby indicating that the responding user associated with user device 108 has accepted the split-payment transaction. In another example, the vector included in the indication may include one or more values that, when added to the encrypted balance for the requesting user and the responding user, do not alter the balance of the requesting user and the responding user. In some non-limiting embodiments or aspects, the indication included in the second encrypted data may include a vector not associated with (e.g., that includes a different value or values) the vector included in the encrypted data included in the split-payment confirmation message, thereby indicating that the responding user associated with user device 108 has not accepted the split-payment transaction. In such an example, when the vector included in the encrypted data is added to the vector included in the second encrypted data, the split-payment transaction may be reversed and/or modified (e.g., the value requested from the responding user may be decreased). In another example, the vector included in the indication may include one or more values that, when added to the encrypted balance for the requesting user and the responding user, alter the balance of the requesting user and the responding user. In such an example, the one or more values, when added to the encrypted balance for the requesting user and the responding user, may indicate that the responding user agrees to a value less than the value that was requested and/or does not agree to any value.

In some non-limiting embodiments or aspects, user device 108 may generate the second encrypted data. For example, user device 108 may generate the second encrypted data based on receiving the input at user device 108 indicating that the split-payment transaction is approved or not approved from the responding user associated with user device 108. In some non-limiting embodiments or aspects, user device 108 may generate the second encrypted data based on the encrypted balance included in the split-payment confirmation message.

In some non-limiting embodiments or aspects, user device 106 and/or user device 108 may generate the split-payment confirmation response message. For example, user device 106 and/or user device 108 may generate the split-payment confirmation response message based on generating the second encrypted data. In some non-limiting embodiments or aspects, user device 108 may include the second encrypted data in the split-payment confirmation response message prior to user device 108 transmitting the split-payment confirmation response message to transaction service provider system 102.

In some non-limiting embodiments or aspects, transaction service provider system 102 may generate an updated encrypted balance. For example, transaction service provider system 102 may generate an updated encrypted balance for a requesting user associated with user device 106 and/or a responding user associated with user device 108. In some non-limiting embodiments or aspects, transaction service provider system 102 may generate the updated encrypted balance based on the split-payment confirmation response message. For example, transaction service provider system 102 may generate the updated encrypted balance based on the split-payment confirmation response message and/or the second encrypted data included in the split payment confirmation response message. In some non-limiting embodiments or aspects, transaction service provider system 102 may generate the updated encrypted balance based on the encrypted balance.

In some non-limiting embodiments or aspects, transaction service provider system 102 may generate the updated encrypted balance without transaction service provider system 102 having access to the secret key. For example, transaction service provider system 102 may generate the updated encrypted balance based on the split-payment request message, the encrypted data included in the split-payment request message, the split-payment confirmation response message, the second encrypted data included in the split-payment confirmation response message, and/or the additive homomorphic cryptographic algorithm.

In some non-limiting embodiments or aspects, transaction service provider system 102 may transmit a split-payment response message. For example, transaction service provider system 102 may transmit a split-payment response message to user device 106 and/or user device 108. In such an example, transaction service provider system 102 may include the updated encrypted balance in the split-payment response message. For example, transaction service provider system 102 may include the updated encrypted balance for the requesting user associated with user device 106 and/or the responding user associated with user device 108 in the split-payment response message.

In some non-limiting embodiments or aspects, transaction service provider system 102 may generate a checksum value. For example, transaction service provider system 102 may generate one or more checksum values based on the encrypted data of the split-payment confirmation message and/or the encrypted balance for the requesting user and the responding user (e.g., second user). In such an example, transaction service provider system 102 may transmit the one or more checksum values to user device 106 and/or user device 108. In some non-limiting embodiments or aspects, user device 106 and/or user device 108 may generate and transmit one or more checksum values to the other of user device 106 and/or user device 108. For example, user device 106 and/or user device 108 may generate and transmit one or more checksum values to the other of user device 106 and/or user device 108 based on the encrypted data and/or the second encrypted data. As a result of generating and/or receiving one or more checksum values, user device 106 and/or user device 108 may determine whether the split-payment transaction is valid (e.g., whether the communication from the other of user device 106 or user device 108 and/or transaction service provider system 102 is genuine or malicious).

Figure 3:
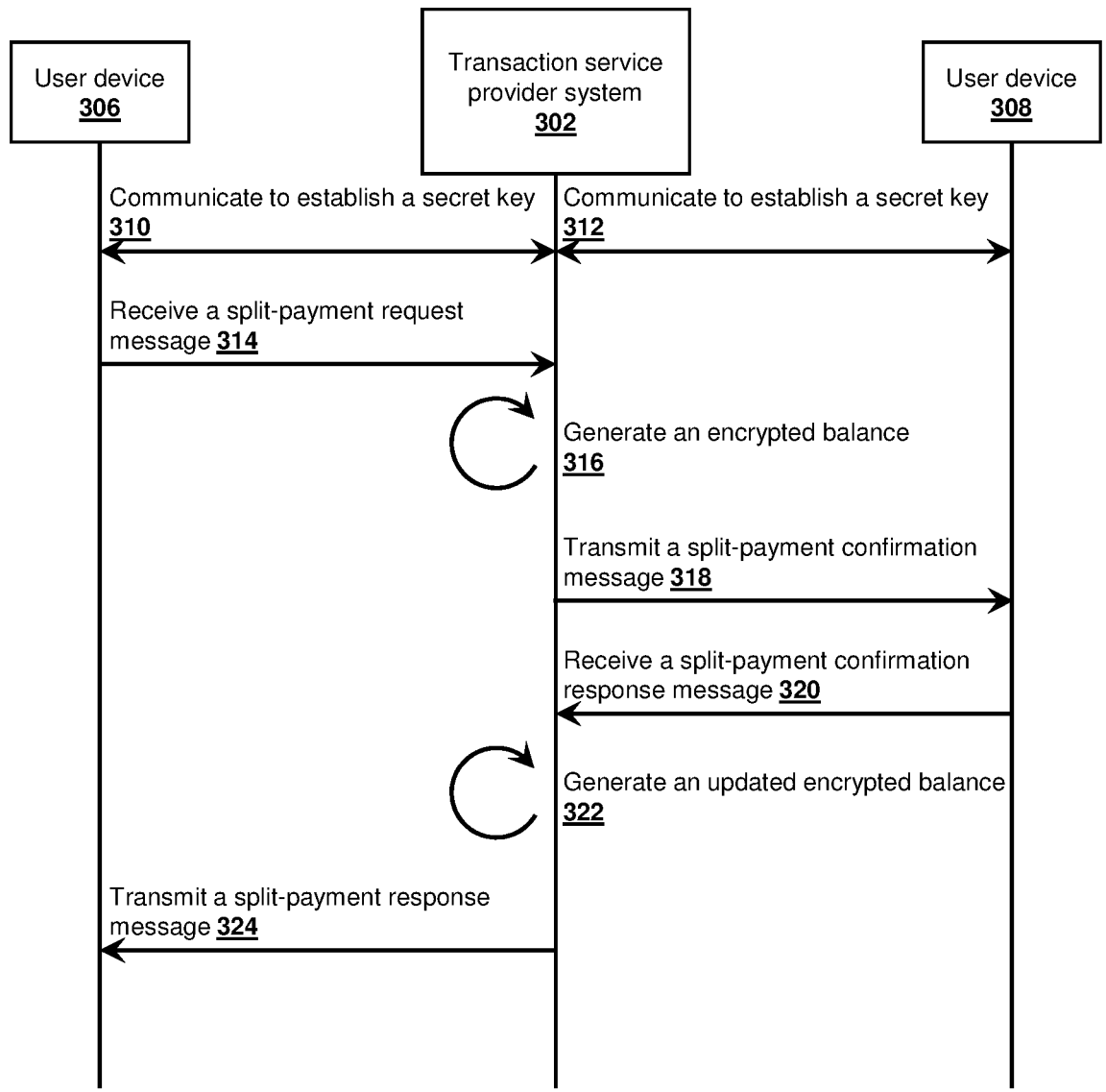
FIG. 3 is a diagram of an implementation of some non-limiting embodiments or aspects of a process for maintaining user privacy in group transactions.

Referring now to FIG. 3, illustrated is a diagram of an implementation 300 of a process for maintaining user privacy in group transactions according to some non-limiting embodiments or aspects. As illustrated in FIG. 3, implementation 300 may include transaction service provider system 302, user device 306, and user device 308. Transaction service provider system 302 may be the same as, or similar to, transaction service provider system 102, user device 306 may be the same as, or similar to, user device 106, and/or user device 308 may be the same as, or similar to, user device 108 (see FIG. 1).

As shown by reference number 310 in FIG. 3, user device 306 may communicate with transaction service provider system 302 to establish a secret key. For example, user device 306 may communicate with transaction service provider system 302 to establish a secret key with user device 308. In such an example, user device 306 may receive and encrypt data with a public key of user device 308. As a result, security may be maintained in that transaction service provider system 302 does not have access to the private key of user device 308 to decrypt communications between user device 306 and user device 308. A secret symmetric key inaccessible to the transaction service provider system 302 may also be established and shared. A secret key may be established by being generated for each group, transaction, or user, and/or may be identified from a key exchange.

As shown by reference number 312 in FIG. 3, user device 308 may communicate with transaction service provider system 302 to establish a secret key. For example, user device 308 may communicate with transaction service provider system 302 to establish a secret key with user device 306. In such an example, user device 308 may receive and encrypt data with a public key of user device 308.

As shown by reference number 314 in FIG. 3, user device 306 may transmit a split-payment request message to transaction service provider system 302. For example, user device 306 may transmit a split-payment request message to transaction service provider system 302, the split-payment request message including encrypted data associated with a split-payment transaction. In such an example, the split-payment transaction may represent a request that a responding user associated with user device 308 agrees to transmit an amount of funds from an account associated with the responding user to an account of a requesting user, the requesting user associated with user device 306.

As shown by reference number 316 in FIG. 3, transaction service provider system 302 may generate an encrypted balance. For example, transaction service provider system 302 may generate an encrypted balance including a value (e.g., a value associated with one or more amounts of funds to be debited from the account associated with the responding user associated with user device 308 that is involved in the split-payment transaction and credited to the account associated with the requesting user). Transaction service provider system 302 may generate the encrypted balance without having access to the secret key established between user device 306 and user device 308. For example, transaction service provider system 302 may generate the encrypted balance based on an additive homomorphic cryptographic algorithm (e.g., by adding the encrypted balance to an initial balance established before initiation of the split-payment transaction by user device 306 based on the additive homomorphic cryptographic algorithm).

As shown by reference number 318 in FIG. 3, transaction service provider system 302 may transmit a split-payment confirmation message to user device 308. For example, transaction service provider system 302 may transmit a split-payment confirmation message to user device 308 based on (e.g., after, in response to, and/or the like) generating the encrypted balance. In some non-limiting embodiments or aspects, the split-payment confirmation message may include the encrypted balance.

As shown by reference number 320 in FIG. 3, transaction service provider system 302 may receive a split-payment confirmation response message from user device 308. For example, transaction service provider system 302 may receive a split-payment confirmation response message from user device 308, the split-payment confirmation response message including second encrypted data. In such an example, the second encrypted data may include an indication that the split-payment transaction is approved by the responding user associated with user device 308.

As shown by reference number 322 in FIG. 3, transaction service provider system 302 may generate an updated encrypted balance. For example, transaction service provider system 302 may generate an updated encrypted balance based on (e.g., by adding) the encrypted balance and the second encrypted balance. In such an example, transaction service provider system 302 may generate the updated encrypted balance based on the additive homomorphic cryptographic algorithm.

As shown by reference number 324 in FIG. 3, transaction service provider system 302 may transmit a split-payment response message to user device 306. For example, transaction service provider system 302 may transmit a split-payment response message to user device 306 including the updated encrypted balance.

Figure 4:
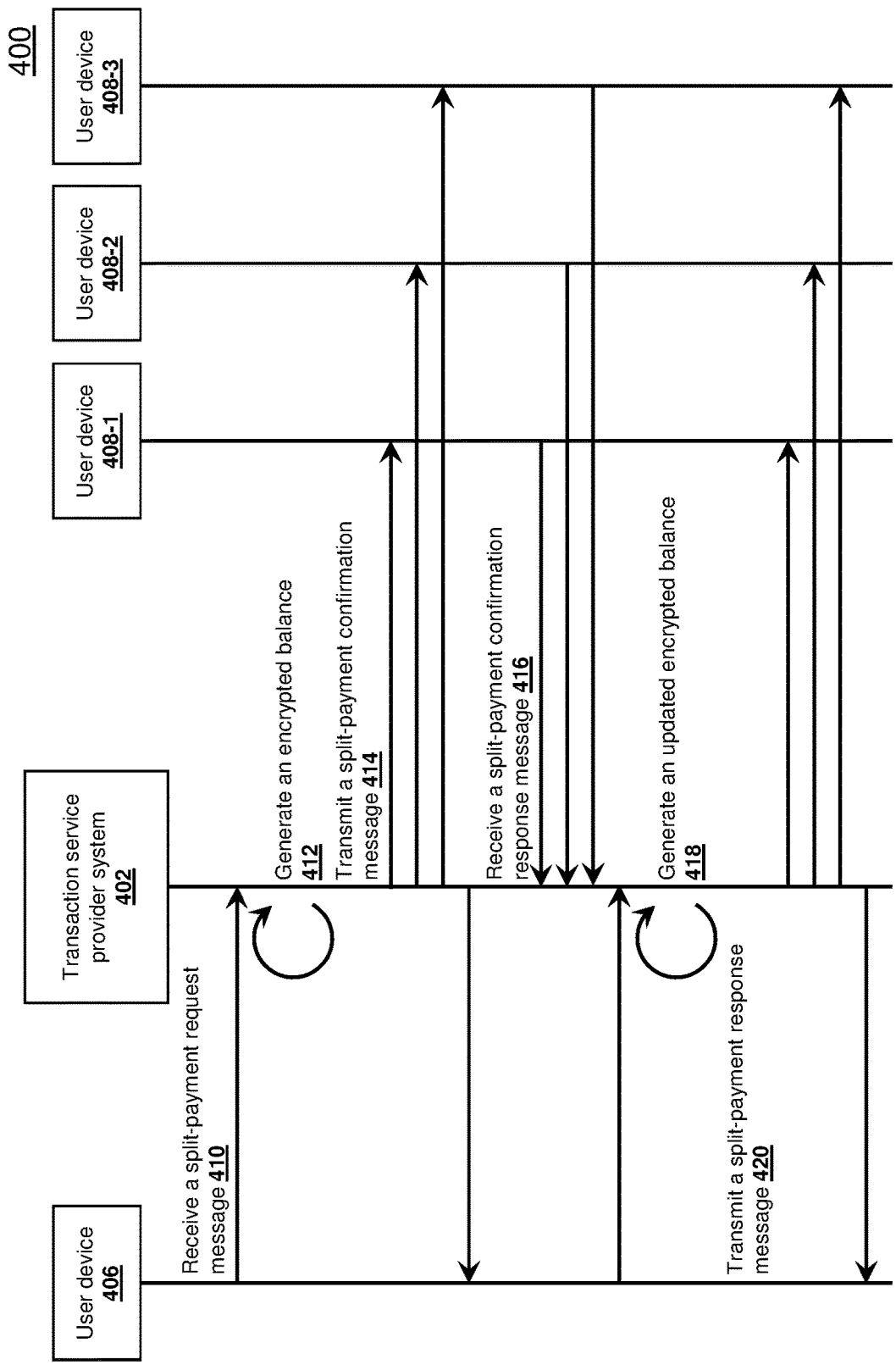
FIG. 4 is a diagram of an implementation of some non-limiting embodiments or aspects of a process for maintaining user privacy in group transactions.

Referring now to FIG. 4, illustrated is a diagram of an implementation 400 of a process for maintaining user privacy in group transactions. As illustrated in FIG. 4, implementation 400 may include transaction service provider system 402, user device 406, user device 408-1, user device 408-2, and/or user device 408-3, where user devices 408-1-408-3 are associated with a first responding user, a second responding user, and a third responding user, respectively. Transaction service provider system 402 may be the same as, or similar to, transaction service provider system 102, user device 406 may be the same as, or similar to, user device 106, and/or user devices 408-1-408-3 may be the same as, or similar to, user device 108 (see FIG. 1).

As shown by reference number 410 in FIG. 4, user device 406 may transmit a split-payment request message to transaction service provider system 402. For example, user device 406 may transmit a split-payment request message to transaction service provider system 402, the split-payment request message including encrypted data associated with a split-payment transaction. In such an example, the split-payment transaction may represent a request that the first responding user associated with user device 408-1 and the second responding user associated with user device 408-2 agree to transmit an amount of funds from accounts associated with the first responding user and the second responding user to an account of a requesting user, the requesting user associated with user device 406. The split-payment transaction may also represent a request that the third responding user associated with user device 408-3 communicate a null value during each round of communication to provide additional security to the split-payment transaction.

As shown by reference number 412 in FIG. 3, transaction service provider system 402 may generate an encrypted balance. For example, transaction service provider system 402 may generate an encrypted balance including a value for each user device (e.g., [2, −1, −1, 0], where the first value (2) is associated with an amount of funds requested be transferred to an account of the requesting user, the second and third values (−1) are associated with an amount of funds requested be transferred from an account of the first responding user and the second responding user, and the fourth value (0) is associated with a zero or null value indicating that funds are not requested from the third responding user). Transaction service provider system 402 may generate the encrypted balance without having access to the secret key established between user device 406 and user device 408-1, user device 408-2, and/or user device 408-3. For example, transaction service provider system 402 may generate the encrypted balance based on based on the encrypted data included in the split-payment request message and an additive homomorphic cryptographic algorithm.

As shown by reference number 414 in FIG. 4, transaction service provider system 402 may transmit a split-payment confirmation message to user device 408-1, user device 408-2, user device 408-3, and user device 406 in a first communication round. For example, transaction service provider system 402 may transmit the split-payment confirmation message based on generating the encrypted balance for user device 406, user device 408-1, user device 408-2, and user device 408-3. In some non-limiting embodiments or aspects, the split-payment confirmation message may include the encrypted balance for user device 406, user device 408-1, user device 408-2, and user device 408-3.

As shown by reference number 416 in FIG. 4, transaction service provider system 402 may receive a split-payment confirmation response message from user device 408-1, user device 408-2, user device 408-3, and user device 406. For example, transaction service provider system 402 may receive a split-payment confirmation response messages from user device 408-1, user device 408-2, and/or user device 408-3, where the split-payment confirmation response messages include second encrypted data. In such an example, the second encrypted data may include an indication that the split-payment transaction is approved by the first responding user and/or the second responding user. Additionally, in such an example, the second encrypted data may include a zero or null value indicating that the responding user associated with user device 408-3 is participating in the communication during the first communication round, but is neither approving nor not approving the split-payment transaction. In some non-limiting embodiments or aspects, a plurality of communication rounds may occur, with one or more of user device 406, user device 408-1, user device 408-2, and/or user device 408-3 transmitting zero or null values during communication rounds where user device 406, user device 408-1, user device 408-2, and/or user device 408-3 are not communicating an indication as to whether or not they approve or do not approve the split-payment transaction. In this way, if one or more messages are intercepted, the details of the split-payment transaction cannot be derived.

As shown by reference number 418 in FIG. 4, transaction service provider system 402 may generate an updated encrypted balance. For example, transaction service provider system 402 may generate an updated encrypted balance based on (e.g., by adding) the encrypted balance and the second encrypted balance. In such an example, transaction service provider system 402 may generate the updated encrypted balance based on the additive homomorphic cryptographic algorithm.

As shown by reference number 420 in FIG. 4, transaction service provider system 402 may transmit a split-payment response message to user device 406, user device 408-1, user device 408-2, and user device 408-3. For example, transaction service provider system 402 may transmit a split-payment response message to user device 406 user device 408-1, user device 408-2, and user device 408-3 including the updated encrypted balance for the requesting user, the first responding user, the second responding user, and the third responding user.

Figure 5:
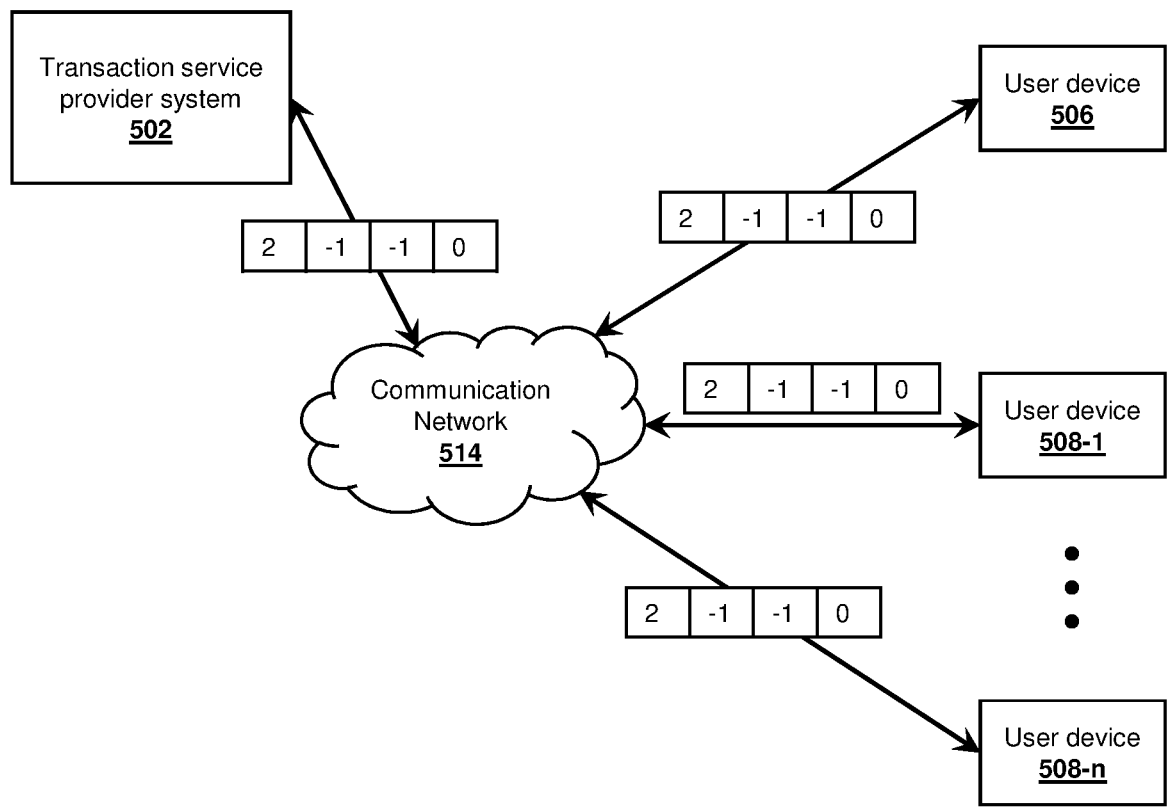
FIG. 5 is a diagram of a system for maintaining user privacy in group transactions.

Referring now to FIG. 5, illustrated is a system 500 for maintaining user privacy in group transactions. System 500 may include transaction service provider system 502, user device 506, user device 508-1, user device 508-2, and/or user device 508-3, where user devices 508-1-508-3 are associated with a first responding user, a second responding user, and a third responding user, respectively. Transaction service provider system 502 may be the same as, or similar to, transaction service provider system 102, user device 506 may be the same as, or similar to, user device 106, and/or user devices 508-1-508-3 may be the same as, or similar to, user device 108 (see FIG. 1).

In some non-limiting embodiments or aspects, a group of users (e.g., a group of users associated with user devices including user device 506 and user devices 508-1-508-n) may initiate a split-payment transaction, where each user device 506 and user devices 508-1-508-n establishes a secret key therebetween that is not known to any server (e.g., not accessible to transaction service provider system 502). For example, one user device (e.g., user device 506 or one of user devices 508-1-508-n) may determine the secret key and send it to the other user devices (e.g., the other of user device 506 or one of user devices 508-1-508-n), encrypting the secret key that was determined with a public key associated with each other user device (e.g., a public key of user device 506 and user devices 508-1-508-n). Transaction service provider system 502 may keep a record of public keys associated with each user device using the system. In such an example, transaction service provider system 502 may not be able to determine the secret key established between user device 506 and user devices 508-1-508-n.

In some non-limiting embodiments or aspects, system 500 may provide privacy against transaction service provider system 502 (e.g., where transaction service provider system 502 may attempt to intercept one or more messages during a split-payment transaction). For example, initially, one of user device 506 and user devices 508-1-508-n may send transaction service provider system 502 a public key associated with the secret key that was established between user device 506 and user devices 508-1-508-n. Transaction service provider system 502 may then replicate an encryption of a value (e.g., zero) one or more times (e.g., N times) to match the group size and, after replicating the encryption, output the result of the encryption as a vector of user balances (e.g., as discussed herein with respect to initial split-payment transaction data). For example, transaction service provider system 502 may be able to generate an encryption of zero based on the public key associated with the secret key since transaction service provider system 502 possesses or has access to the public key associated with the secret key.

In some non-limiting embodiments or aspects, one of user device 506 and user devices 508-1-508-n may transmit a message to transaction service provider system 502 to cause transaction service provider system 502 to involve (e.g., include) a new user device in the split-payment transaction. In such an example, the one of user device 506 and user devices 508-1-508-n may establish a secret key (e.g., transmit a secret key) to the new user device. Transaction service provider system 502 may then add another zero to the vector of user balances and inform the other user device 506 and user devices 508-1-508-n that the new user device was added to the split-payment transaction.

In some non-limiting embodiments or aspects, user device 506 and user devices 508-1-508-n may receive data and/or messages associated with an initial encrypted balance from transaction service provider system 502, decrypt the initial encrypted balance, and process payments via another channel (e.g., user device 506 and user devices 508-1-508-n may transmit transaction data associated with a payment transaction associated with the split-payment transaction involving the requesting user associated with user device 506 and the user device 508-1-508-n associated with the respective user to a payment processing system (e.g., transaction service provider system 502, another transaction service provider system, an issuer system, and/or the like)).

In some non-limiting embodiments or aspects, the split-payment transaction may proceed in a series of rounds. For example, in each round, a user associated with user device 506 or user devices 508-1-508-n may request one unit of currency (e.g., one amount of funds) from another user associated with another of user device 506 or user devices 508-1-508-n. Each user associated with user device 506 and user devices 508-1-508-n may then send transaction service provider system 502 split-payment transaction data including a vector of user balances of size N where all entries are zero except for a value (e.g., $1 and/or the like) for the entry associated with user device 506 or one of user devices 508-1-508-n of a user who will be charged. Users wishing not to be involved in the split-payment transaction for a given round may provide, upon receipt of split-payment transaction data from transaction service provider system 502 including the vector of user balances, the vector including the value for the entry associated with a request for funds from the respective user, input to their respective user device 506 or one of user devices 508-1-508-n, the input including a different value in the respective user's entry for their respective account (e.g., a different value that reduces and/or eliminates the amount associated with the respective user when added to the value requested by the requesting user) as described herein. Transaction service provider system 502 may then receive split-payment transaction data (e.g., vectors of user balances) from each of user device 506 and user devices 508-1-508-n and sum the split-payment transaction data (e.g., the vectors included in the split-payment transaction data) received from each user device 506 and user devices 508-1-508-n, the sum added to the initial encrypted balance. Transaction service provider system 502 may then subtract one from the balance of each user that submitted a vector. This results in each user either breaking even or transferring one unit to another user. In this example the values in users' balances represent the amount of debt they owe to the group, such that providing a unit of currency (e.g., $1) in the balance of another user means giving them one unit of debt (e.g., giving a request for $1 from the user).

In some non-limiting embodiments or aspects, transaction service provider system 502 may take the sum of the value (e.g., a checksum value) to be added to the initial encrypted balance and poll each of user device 506 and user devices 508-1-508-n to verify that the value is equal to the number of members in the group. This check protects against silent growth in the total balance of the group. In some non-limiting embodiments or aspects, the checks can be done asynchronously with other operations and rounds can be rolled back if an issue is found.

In some non-limiting embodiments or aspects, to support charge requests, transaction service provider system 502 may first assign each member of the group a power of 2, such that group member i is assigned the value $2^i$. Each user associated with user device 506 or one of user devices 508-1-508-n then has an additional encrypted value associated with them formed by subtracting one from the i-th element of their split-payment transaction data (e.g., theft request vector). Thus, a user who is not making any charges has a value 0 included in theft split-payment transaction data, and a user who is requesting a payment has a value −1 in theft split-payment transaction data. Deriving users' values from the split-payment transaction data sent by their respective user device 506 and user devices 508-1-508-n instead of sending them separately may save one ciphertext of bandwidth from each user device 506 and user devices 508-1-508-n, thereby increasing computational efficiency during the split-payment transaction by decreasing the amount of communication that may be needed to complete the split-payment transaction. Transaction service provider system 502 may then multiply each value (e.g., via scalar multiplication) with the power of 2 assigned to that group member and send the sum of the resulting values to each user. Each user device 506 and user devices 508-1-508-n may then determine from this value exactly which parties are charging in this round since the resulting sum will be unique for each subset of powers of 2. In the case that only one party is charging, a user who disagrees with a charge can reject the charge by initiating a charge of the same value in the opposite direction.

In some non-limiting embodiments or aspects, in the event that more than one user device 506 or 508-1-508-n is charging (e.g., acting as a requesting user and requesting funds from one or more users acting as responding users), the next rounds may be used to resolve the collision. In the first round, all the transactions of the previous round are rolled back by having the chargers submit a "+2" in their own indexes and the charges a "−1". In subsequent rounds, each of the charges are made again with the first user device making its request in the first round, the second user device making its request in the second round, and so on. Other users associated with another user device wanting to make a charge wait until the resolution process completes to make their charges. This technique can be used to resolve nested collisions. Since by the time a request completes the value sent to identify the charger will definitely be a power of 2, there can only be one user who has been charged and one or more of user device 506 or one of user devices 508-1-508-n may determine, based on the log of that power of 2, the identity of the charger. Integrity for this mechanism can simply be achieved by having a user who has been framed (e.g., not charged correctly and/or indicated as not charging correctly) report that the user has been framed.

In some non-limiting embodiments or aspects, secure pseudorandom functions (PRFs) such as the advanced encryption standard ("AES") may be used rather than the more powerful additively homomorphic encryption of the scheme described thus far. These PRFs may be indistinguishable as output (e.g., as a string) when compared to a random output (e.g., a random string) for a given input. In some non-limiting embodiments or aspects, a PSR may be defined as a function F where $\{0,1\}^n \times \{0,1\}^n = \{0,1\}^n$ which is an efficiently computable, length-preserving keyed function. Accordingly, F may be referred to as a PRF for all probabilistic polynomial time distinguishers D, such that:

$$|Pr[D^{Fk}(1^n)=1] - Pr[D^{fn}(1^n)=1]|$$

is negligible where $k \leftarrow \{0,1\}^n$ is chosen uniformly at random and fn is chosen uniformly at random from the set of functions mapping n-bit strings to n-bit strings.

For example, an additively homomorphic encryption scheme may be masked by an output of a PRF. Instead of a secret key including encryption keys public key ("pk") and private key ("sk"), user device 506 and user devices 508-1-508-n may establish a PRF key sk for a PRF f and use a different PRF output to mask each value sent to transaction service provider system 502. That is, for every ciphertext $V_{i,j}$ sent from user f to transaction service provider system 502, there may be a PRF output $r_{i,j}=f(sk, gid\|tid\|i\|j)$ and the value sent to transaction service provider system 502 instead of $V_{i,j}$ will be $V_{i,j}+r^{i,j}$. It will be appreciated that one or more devices of system 500 may additionally or alternatively use a Pseudo-Random Generator (PRG) instead of a PRF (where values of $r_{i,j}$ are outputs of the PRG in order), use of a PRF leads to ease of exposition, especially because one or more devices of system 500 may eventually instantiate the PRF with AES.

In some non-limiting embodiments or aspects, to maintain correctness with this change, each user device 506 and user devices 508-1-508-n may compute all values of $r_{i,j}$ in each round and keep a running sum of all the rs that have been added into balances of each respective user. When checking that the sum used for the integrity check matches the group size, each user device 506 and user devices 508-1-508-n may first subtract the sum of all r values used in that round. Likewise, when receiving balances from transaction service provider system 502, each user device 506 and user devices 508-1-508-n may subtract the sum of all the r values that have been added into the balance to retrieve their actual balance. Finally, when checking the identity of a charge requester, each user device 506 and user devices 508-1-508-n may subtract the product of the relevant r values and the powers of two with which they were multiplied.

In some non-limiting embodiments or aspects, the PRF-based scheme may be secured against malicious servers (e.g., where transaction service provider system 502 and/or another server computer is operated by a malicious user) with no changes to transaction service provider system 502 (e.g., the operations performed in association with transaction service provider system 502), no increase in per-round bandwidth, and minimal changes on each user device 506 and user devices 508-1-508-n. In place of masking each value sent to transaction service provider system 502 with a pseudorandom $r_{i,j}$, user device 506 and user devices 508-1-508-n may transmit the value $sv_{i,j}+r_{i,j}$ for a fixed s also generated when the split-payment transaction is initiated from the PRF.

In some non-limiting embodiments or aspects, one or more devices of system 500 may verify the integrity of the split-payment transaction. For example, one or more devices of system 500 may check that the sum sent from transaction service provider system 502 equals s·N instead of just N. In some non-limiting embodiments or aspects, one or more devices of system 500 may also add an integrity check to the setup process since transaction service provider system 502 may not be configured to generate a vector of 1s on its own and needs to be sent such a vector from one of user device 506 or user devices 508-1-508-n. Other devices of user device 506 and user devices 508-1-508-n may also check that the vector sent to transaction service provider system 502 actually consists of all 1s. In some non-limiting embodiments or aspects, user device 506 and/or user devices 508-1-508-n, upon receiving a new balance from transaction service provider system 502, may determine that the new value will be at most one away from the old value. As such, user device 506 and user devices 508-1-508-n can check each of the three possible values by multiplying the possible balances by s and determining which matches the sent value after removing the rvalues. If the new value does not match one of the three possibilities, one or more devices of system 500 may determine that a collision in payment requests has occurred and/or transaction service provider system 502 is suspicious.

In some non-limiting embodiments or aspects, user device 506 and user devices 508-1-508-n may perform a linear scan of the N possible cases where only one user associated with one of user device 506 or one of user devices 508-1-508-n of the group is making a request by checking if the value received from transaction service provider system 502 is equal to $-s \cdot 2^i$ for $i \in [N]$ after removing the r values. If none of these match, then there has been a collision, and the devices included in system 500 may no longer able to determine which communications from user device 506 and user devices 508-1-508-$n$ caused the collision. In such a case, during the next round, values from this round may be re-sent but without the s multiplied in, as would have been the case during the basic PRF-based scheme. After transaction service provider system 502 sends responses, the tags from the previous round are used to verify that one or more transactions communicated via transaction service provider system 502 did not modify the values and then the identities of the chargers can be checked just as before. The roll-back round may increase the amount by which balances are rolled back to account for the repeat of the colliding transactions being added by transaction service provider system 502 into balances. Finally, since each of user device 506 and user devices 508-1-508-$n$ may not know what value to expect for balances of each other user associated with each other of user device 506 and user devices 508-1-508-$n$ involved in the split-payment transaction, each of user device 506 and user devices 508-1-508-$n$ may upload a masked value representing their balance and then other devices of user device 506 and user devices 508-1-508-$n$ may check to make sure that the value matches the one transmitted by transaction service provider system 502.

In some non-limiting embodiments or aspects, for a split-payment transaction Pp=(Setup, Join, Request, Settle, Trace) with security parameter A uses a PRF f with range $\{0,1\}^\lambda$, where setup, join, request, settle, and trace represent one or more functions as described herein. Transaction service provider system 502 may execute a setup function and store a vector p of length N constructed from copies of 0. For example, where "a" represents a vector of length N constructed from N copies of 1, user device 506 and user devices 508-1-508-$n$ may store a value $p_i=0$ and the key sk in a database. Once a split-payment transaction is initiated, the split-payment transaction may proceed in rounds, and user device 506 and/or user devices 508-1-508-$n$ may communicate messages therebetween at a rate (e.g., 1 message per round, 2 messages per round, and/or the like). As discussed, m may refer to the round during which a current operation has been initiated, and $r_{m,i,j}$ may refer to a function f(sk, gid||m||i||j). During setup, one or more of user device 506 and/or user devices 508-1-508-$n$ may store a value $p_i=0$ and the public key of the secret key.

Transaction service provider system 502 may add another user to the split-payment transaction based on and set as N=N+1. For example, when adding another user to the split-payment transaction, transaction service provider system 502 may add another copy of zero or null to the end of vector p, and send a message to user device 506 and user devices 508-1-508-$n$ with the new value of N, thereby indicating that another user is involved in the spilt-payment transaction. In some non-limiting embodiments or aspects, once an encrypted balance is established as described, one or more devices of system 500 may proceed according to the following steps.

In a next round m, one or more of user device 506 or one of user devices 508-1-508-$n$, referred to as $U_i$, may create a vector $v_i$ where $V_{i,j}=1+r_{m,i,j}$ and $V_{i,k}=0+r_{m,i,k} \forall k \neq i$. The remaining user devices of user device 506 or one of user devices 508-1-508-$n$, referred to as Uk, may create vectors $V_k$ where $V_{k,k}=1+r_{m,k,k}$ and $V_{k,k'}=0+r_{m,k,k'}$, $\forall k' \neq k$. Each of user device 506 or one of user devices 508-1-508-$n$ may send an encrypted balance (e.g., a vector $v_i$ or $v_k$) to transaction service provider system 502. Based on (e.g., in response to) receiving the messages from one or more of user device 506 or one of user devices 508-1-508-$n$ for the round, transaction service provider system 502 takes the sum $v=\Sigma$ (from i=1 to i=N) $v_i$ and also sums the values in v to determine an encrypted balance (e.g., vector v'). Transaction service provider system 502 may then set $p=p-v \div a$ and compute the value $c=\Sigma$ (from i=1 to i=N, $(v_{i,i}-1) \cdot 2^i$. Transaction service provider system 502 may send the encrypted balance (e.g., a tuple including v', c, $p_j$) to $U_l$ (e.g., one or more of user device 506 and/or user device 508-1-508-$n$), $l \in [N]$. Each of user device 506 or one of user devices 508-1-508-$n$ may then receive, from transaction service provider system 502, data and/or messages associated with the encrypted balance (v'*, c*, $p_i$*).

In some non-limiting embodiments or aspects, there may be a number of cases: if v'*$\neq$N+$\Sigma$(from i=0 to i=N) $\Sigma$ (from j=0 to N) $r_{m,i,j}$ according to which one of user device 506 or one of user devices 508-1-508-$n$ may send an error message to transaction service provider system 502 who, based on receipt of the error message, may sets p=p+v−a and output $\perp$. Additionally or alternatively, if c*=−$2^i$−$\Sigma$ (from j=0 to N) $r_{m,i,j}$ for some $i \in [N]$, each $U_i$ (e.g., user device 506 or one of user device 508-1-508-$n$) may set $P_i=P_i$*. In this case, $U_i$ may transmit an output 1 to transaction service provider system 502 in a case where $V_{i,j}=1$ (e.g., if $U_i$ did not make a request). Otherwise, the output of this request may be set to a unique identifier tid that refers to the round in which the transaction took place. If neither of the above cases apply, then one or more devices of system 500 may determine that more than one request collided in the same round. For example, where vector c consists of the values $i_1, \ldots, i_N$ such that c*=$\Sigma$ (for j=1 to N) $(-2^{i_j}-r_{m,i_j,i_j})$. In the next round (m+1), each of user device 506 and user devices 508-1-508-$n$ involved in the split-payment transaction submits a vector $v_i$ such that $v_{i,i}=p_i-p_i-r_{m,i,j}+r_{m+1,i,i}$ and $v_{i,k}=0+r_{m+1,l,k}$ and $v_{i,k}=0+r_{m+1,i,k} \forall k \neq i \in [N]$ and transaction service provider system 502 behaves as above. Then the various requests that collided in this round are repeated, each in a subsequent round, in order from smallest to largest value of $i_j$ as the requestor.

In some non-limiting embodiments or aspects, transaction service provider system 502 may output the vector p to user device 506 or one of user devices 508-1-508-$n$. For example, transaction service provider system 502 may output the vector p where the vector p is formed by setting, for each entry $p_i \in p$, $p_i=p_i-\Sigma$ (from m'=1 to m) $\Sigma$ (from j=1 to N) of $r_{m,i,j}$.

In some non-limiting embodiments or aspects, when performing a trace function, transaction service provider system 502 may set v*=p*$_i$−p$_j$−$\Sigma$ (from l=1 to N) for the values of p$_j$ and p*$_j$ before and/or after the round m* referred to by tid. If v*=0, then may be set to $\perp$. Additionally or alternatively, transaction service provider system 502 may look at the value of c* in that round and set i*=$\log_2$ (−c*−$\Sigma$ (for l=1 to N $(r_{m,l,l} \cdot 2^l)$. In such non-limiting embodiments or aspects, transaction service provider system 502 may provide as output (i*, v*).

In some non-limiting embodiments or aspects, system 500 (e.g., one or more devices of system 500) may be configured to execute a PRF f with range $\{0, 1\}^\lambda$. For example, during a split-payment transaction, communication to settle the split-payment transaction between user device 506 or one of user devices 508-1-508-$n$ may proceed in rounds, with messages communicated between transaction service provider system 502 and user device 506 or one of user devices 508-1-508-$n$ at a rate of one per round. In one example, m may at any time denote the round number at which the current operation began, $s=f(sk, 0)$ and $r_{m,i,j}$ may denote $f(sk, gid\|m\|i\|j)$.

In some non-limiting embodiments or aspects, transaction service provider system 502 may store a vector p of length N constructed from copies of 0. A user device $U_i$ of user device 506 or one of user devices 508-1-508-$n$ may send transaction service provider system 502 a value a, where a represents a vector of length N constructed from N copies of a. Transaction service provider system 502 may then send a to each of user device 506 or one of user devices 508-1-508-$n$, and each user device 506 or one of user devices 508-1-508-$n$ may reject (outputting $\perp$) if a is $f(sk, 1)$. Each of user device 506 or one of user devices 508-1-508-$n$ may then store values $p_i=0$, $p_i'=0$, and the public key sk associated with the secret key that was established between each of user device 506 or one of user devices 508-1-508-$n$. Transaction service provider system 502 may set gid to the next available value, starting at 0. In some non-limiting embodiments or aspects, transaction service provider system 502 may set $N=N+1$, add another copy of 0 to the end of vector p, and transaction service provider system 502 may send a message to the users with the new value of N. In some non-limiting embodiments or aspects, a split-payment transaction may proceed according to the following steps: in a round m, a user $U_i$ device of user device 506 or one of user devices 508-1-508-$n$ $U_i$ may create a vector $v_i$ where $v_{i,j}=s+r_{m,i,j}$ and $v_{i,k}=0+r^{m,i,k}$ $\forall k \neq i$. All other user devices $U_k$ of user device 506 or one of user devices 508-1-508-$n$ Uk may create vectors where $v_{k,k}=s+r_{m,k,k}$ and $v_{k,k}=0+r_{m,k,k'}$ $\forall k' \neq k$. Each user device of user device 506 and user devices 508-1-508-$n$ may then send a vector $v_i$ or $v_k$ to transaction service provider system 502. Based on receiving the messages from user device 506 and user devices 508-1-508-$n$, transaction service provider system 502 may determine the sum of the values included in v to arrive at v'. Transaction service provider system 502 may then sets $p=p-v+a$ and compute the value $c=\Sigma$ (for $i=1$ to N) $(v_{i,j}-1)\cdot 2^i$.

Transaction service provider system 502 may send the tuple $(v', c, p_l)$ to user $U_l$, $l \in [N]$. Each of user device 506 or one of user devices 508-1-508-$n$ may then receive the values $(v'^*, c^*, p_i^*)$ from transaction service provider system 502. In such an example, there are a number of cases: if $v' \neq sN+\Sigma$ (from $i=0$ to N) $\Sigma$ (from $j=0$ to N) $r_{m,i,j}$, at least one user device may transmit an error message to transaction service provider system 502 that sets $p=p+v-a$ and outputs Otherwise, if $c^*=-2^i \cdot s-\Sigma$ (from $j=1$ to N) $(r_{m,i,j}\cdot 2^j)$ for some $i \in [N]$, the user device may determine whether $p_i^*=p_i+xs+\Sigma$ (from $j=1$ to N) of $r_{m,i,j}$ for $x \in \{-1,0,1\}$. If so, transaction service provider system 502 may determine that $p_i=p_i^*$ and $p'_i=p'_i+x$ for the appropriate x, and the output of this request may be a unique identifier tid that refers to the round in which the split-payment transaction took place. If $v_{i,i}=1$ (e.g., if $U_i$ did not make a request), user device i may send an error message to transaction service provider system 502 that, in response to receiving the error message, may output $\perp$.

In embodiments where neither of the above-noted embodiments is applicable, one or more devices of system 500 may determine that more than one Request collided in the same round and/or that transaction service provider system 502 is not acting as expected. In the next round (m+1), the user devices associated with the users may transmit the same vectors as were sent during the previous round m but with updated values for r and by foregoing multiplying anything by s. In some non-limiting embodiments or aspects, the values sent from transaction service provider system 502 in round m+1 may be $(v'^{}c^{}, p_i^{**})$.

Based on receiving responses from transaction service provider system 502, each user device may determine that the values received from transaction service provider system 502 in the given round are associated with the same values received in the previous round (having modulo differences due to lack of s and the new values for r). Accordingly, one or more user devices 506, 508-1-508-$n$, may first determine that $v'^{}=N+\Sigma$ (from $i=1$ to N) $\Sigma$ (from $j=1$ to N) $r^{m+1,i,j}$ and $s\cdot(pi^{}-\Sigma$ (from $j=1$ to N) $r^{m+1,i,j,i})=p_i^*-\Sigma$ (from $j=1$ to N) $r_{mi,i}$l. Thus, where vector c includes the values $i_1 \ldots i_N$ such that $c^{**}=\Sigma$ (from $j=1$ to N) $(-2^{ij}-r_{m+1,ij}\cdot 2^j)-\Sigma$ (from $j=1$ to N) $r_{m,j,j}\cdot 2^j$. Where one or more devices of system 500 determines that one or more of the above-noted determinations fail (e.g., are not determined to be true), the one or more devices of system 500 may output a $\perp$.

In a next round (m+2), each user device 506, 508-1-508-$n$ may transmit a vector vi such that $v_{i,i}=p_i^{**}-p_i-r_{m,i,i}-r_{m+1,i,i}+r_{m+2,i,i}$ and $v_{i,k}=0+r_{m+2,i,k}$ $\forall k \neq i \in [N]$. In such a round, various requests that collided may be repeated, each in a subsequent round, in order from smallest to largest value of $i_j$ as the requester.

In some non-limiting embodiments or aspects, transaction service provider system 502 may provide as output the vector p to one or more of user devices 506, 508-1-508-$n$. In such an example, each user device 506, 508-1-508-$n$ may transmit a masking of a stored value $p'_i$ associated with the respective user device 506, 508-1-508-$n$ to transaction service provider system 502, which may unmask and retrieve the value. The one or more user devices may then determine that for each $i \in [N]$, $p'_i \cdot s=p_i-\Sigma$ (from m'=1 to m) $\Sigma$ (from j=1 to N) and output $\perp$ if one or more checks fail. The output vector p may be formed by concatenating the $p_i$s. In some non-limiting embodiments or aspects, one or more user devices 506, 508-1-508-$n$ may determine whether $p^*_j=p_j+xs+\Sigma$ (for l=1 to N) $r_{mi,ij}$ for $x \in \{-1, 0, 1\}$ and, if so, the one or more user devices 506, 508-1-508-$n$ may determine $V=x$ for the matching x. If no value of x matches, the one or more user devices 506, 508-1-508-$n$ may output $\perp$. If $v^*=0$, then one or more devices of system 500 may determine that if $v^*=0$, $i^*=\perp$. Otherwise, if $i'^* \in [N]$, one or more devices of system 500 may determine that the value for which $c^*=-2^{i'}\cdot s-\Sigma$ (from l=1 to N) $r_{m,i,i}\cdot 2^i$, and as a result, to output $(i^*, v^*)$.

The bandwidth per round for the embodiments described herein may be O(N) ciphertexts from each of user device 506 and user devices 508-1-508-$n$ to transaction service provider system 502 and then O(1) (really 3) ciphertexts from transaction service provider system 502 back to each of user device 506 and user devices 508-1-508-$n$. The constants differ dramatically, however, as the ciphertexts in the PRF-based schemes can just be 128 bits long compared to the group elements of the encryption-based approach. With the stronger assumption of fully-homomorphic encryption FHE and at even higher practical cost, the asymptotic bandwidth of the encryption-based scheme can be reduced to O(N). All three schemes proceed in rounds such that there is one transaction per round as long as there is no collision between users trying to make charges at the same time. In the case of a collision, the semihonest schemes waste two rounds (a first round to determine that a collision occurred, and a second round to roll back communications that occurred during the collision) whereas the malicious scheme wastes three rounds (a first round to retrieve non-tag version of values, a second round to determine that a collision occurred, and a third round to roll back communications that occurred during the collision). In some non-limiting embodiments or aspects, transmitting data and/or messages associated with the encrypted balance may require one message of size O(N) from transaction service provider system 502 to each of user device 506 and user devices 508-1-508-n except in the malicious case where this is preceded by messages of size O(1) from each user to transaction service provider system 502.

With continued reference to FIG. 5, the bandwidth per round for the embodiments or aspects described may be O(N) ciphertexts from each user device 506 and user device 508-1-508-n transmitted to transaction service provider system 502 and back to each respective user device 506 and user device 508-1-508-n. The constants may differ dramatically, however, the ciphertexts in the PRF-based schemes can just be a finite length (e.g., 128 bits long) compared to the group elements of the encryption-based approach. With the stronger assumption of fully-homomorphic encryption and at even higher practical cost, the asymptotic bandwidth of the encryption-based scheme can be reduced to O(sqrt (N)) using a compressed queries technique.

All three embodiments may proceed in rounds such that there may be one transaction per round as long as there are no collision between communications between user device 506 and user device 508-1-508-n that are submitting charges to the split-payment transaction in the same round. In the case of a collision (e.g., where two or more changes are made to the split-payment transaction in the same round), the semi-honest embodiments may include two more rounds (a first round to determine, at one or more devices of system 500, that a collision occurred, and a second round to roll back transactions based on determining that the collision occurred) whereas malicious embodiments may include three more rounds (a first round to retrieve non-tag version of values, a second round to determine, at one or more devices of system 500, that a collision occurred, and a third round to roll back transactions based on determining that the collision occurred).

The Settle operation may include one message of size O(N) from the transaction service provider system 502 to each user device 506 and user device 508-1-508-n except in the malicious case where this is preceded by messages of size O(1) from each user device 506 and user device 508-1-508-n to the transaction service provider system 502.

In some non-limiting embodiments or aspects, transaction service provider system 502 may perform the same and/or a similar process in each round regardless of the embodiment implemented and may perform the same or similar operations in time $O(N^2)$. However, the operations in the encryption-based embodiments may be group operations whereas the operations in both PRF-based embodiments may be just additions of security parameter-sized values. The Settle operation may include O(N) work at the transaction service provider system 502 to transmit data and/or messages associated with the encrypted balances, and transaction service provider system 502 storage may be O(N) to hold data and/or messages associated with the encrypted balances. In some non-limiting embodiments or aspects, user device 506 and/or user devices 508-1-508-n may perform operations in O(2") in each round to prepare and send an encrypted vector plus a constant number of decryptions. There could also be linear work involved in case of a collision of charges. The encryption-based solution is only efficient if the group size is small, as computing large powers of two for each user using only addition of ciphertexts can rapidly become exponentially costly (all other operations are actually only linear in this scheme). The PRF-based embodiments may be performed in O(M) time to generate all the PRF outputs and take the necessary sums. The malicious solution adds lower order terms for various checks but may still include O(M) time in a normal round, with the potential cost of an extra round in the case of a collision. Settling can be performed between one or more devices of system 500 in O(N) time by the client if the large sum that needs to be taken is built incrementally and saved during each round.

In some non-limiting embodiments or aspects, one or more devices of system 500 may be able to determine which user device 506 and/or user devices 508-1-508-n is attempting to intercept messages and/or operate as a malicious device so as to prevent such user device 506 and/or user devices 508-1-508-n and/or prevent membership of such user device 506 and/or user devices 508-1-508-n in future groups. To do so, transaction service provider system 502 may transmit each user all the messages it received in a previous round, so the user device 506 and/or user devices 508-1-508-n can check to see which user's input was malformed. This approach may require transaction service provider system 502 to transmit M ciphertexts to each user device of user device 506 and/or user devices 508-1-508-n, however. In order to tell whether a user device 506 and/or user devices 508-1-508-n violated integrity, other user devices of user device 506 and/or user devices 508-1-508-n only need to learn whether i) the user device 506 and/or user devices 508-1-508-n submitted a vector that did not sum to zero, or ii) the user device 506 and/or user devices 508-1-508-n manipulated the value in the cell corresponding to the balance associated with the respective user device of user device 506 and/or user devices 508-1-508-n so as to frame someone else for making a charge. As such, transaction service provider system 502 may only send the sum of each user's vector and the value in the cell corresponding to that user's balance, amounting to only 2N ciphertexts to each user.

In some non-limiting embodiments or aspects, the embodiments or aspects described herein may be modified to anticipate user devices going offline. For additively homomorphic encryption-based embodiments, transaction service provider system 502 may supply a vector that represents not making any charges for any user device (e.g., user device 506 and/or one or more of user devices 508-1-508-n) that do not send anything (e.g., split-payment transaction data, and/or the like) in any round. In PRF-based embodiments, transaction service provider system 502 may do the same and include a plaintext vector for one or more user devices (e.g., user device 506 and/or one or more of user devices 508-1-508-n) that are offline. Additionally or alternatively, transaction service provider system 502 may notify one or more user devices of user device 506 and/or one or more of user devices 508-1-508-n about which users did not send a message in a given round so that one or more other users associated with user device 506 and/or one or more of user devices 508-1-508-n may determine whose r values to omit from the various sums. In some non-limiting embodiments or aspects, the system 500 may guarantee that security will degrade in a predictable manner in the absence of communication from one or more of user device 506 and/or one or more of user devices 508-1-508-n, with split-payment transaction anonymity being equal to the number of online user devices and integrity holding so long as one honest user is online. Even if no honest users are online when a malicious message is transmitted between one or more devices of system 500, the one or more devices of system 500 may still detect the malicious message when the one or more devices of system 500 come back online later and transaction service provider system 502 transmits messages to the one or more devices of system 500 that were missed. The same approach may be applied in the malicious security solution, but there may be a tradeoff to be made. Allowing transaction service provider system 502 to be resilient to offline users would include giving transaction service provider system 502 the ability to exclude transactions represented by split-payment transaction data transmitted by user devices associated with one or more users by saying that one or more user devices (e.g., user device 506 and/or one or more of user devices 508-1-508-n) were not present for communication of split-payment transaction data for that round. In some non-limiting embodiments or aspects, transaction service provider system 502 may not know what a user is doing in any round, meaning this kind of attack mainly amounts to a denial of service possibility (and transaction service provider system 502 may always deny service more directly), but our security notion would need to be modified to explicitly allow this kind of omission on the part of the server.

The definitions described herein describe a setting where each of user device 506 and/or one or more of user devices 508-1-508-n are always online, providing an anonymity set of size N for each transaction and enforcing integrity against N−1 malicious users. When the number of user devices of user device 506 and/or one or more of user devices 508-1-508-n is reduced to N'<N, the embodiments described herein may provide an anonymity set of size N', integrity against N'−1 user devices of user device 506 and/or one or more of user devices 508-1-508-n, and still satisfy correctness requirements.

In some non-limiting embodiments or aspects, where communication split-payment transaction data associated with one unit of currency at a time would require an amount of rounds that are undesirable, the round structure may be modified so that each round is accompanied by a value multiplier. Each round would have a predetermined value, and all split-payment transactions included in a given round would be of that value. The schedule of round values could be fixed at some amount (e.g. increasing denominations of currency or the first several powers of 2) or set by the group itself if the group is willing to leak its choice of schedule. It is important that the multiplier be applied by transaction service provider system 502 (by multiplying each received vector) or else this would open the scheme to attacks on integrity and break the correctness of our approach for rejecting charges.

In some non-limiting embodiments or aspects, the systems and methods disclosed herein may allow for the increase of the number of transactions in a round without increasing bandwidth. This can be achieved since AES is typically used to instantiate our PRF and that it has a 128-bit output. If encrypted balances associated with one or more users are unlikely to exceed some large value (e.g., 221), each masked value could be divided into two (e.g., split) and then sent to transaction service provider system 502 into six (6) separate slots into which users can put transactions. After unmasking the values they receive back from transaction service provider system 502, users treat the balance as a sum of six "sub-balances" whose sum is their actual balance. This occurs transparently to the human user whose interaction with the app is unaffected by the optimization.

A user device 506, 508-1-508-n making a charge can indicate the total amount to charge (split across several rounds) by sending a second encrypted value containing the amount whereas other user devices 506, 508-1-508-n may upload an encryption of zero. Transaction service provider system 502 may then sum the encrypted values and sends the result to each user device 506, 508-1-508-n. As such, receiving users may know how much they will be charged at once and can give the application permission to accept charges for the appropriate number of rounds. This would enable a user-interface while the application handles the details of the underlying split-payment transaction. At the same time, this does not introduce new security concerns because additional charges beyond the amount claimed will register as new transactions, and the real balances will not be affect by such changes.

Figure 6:
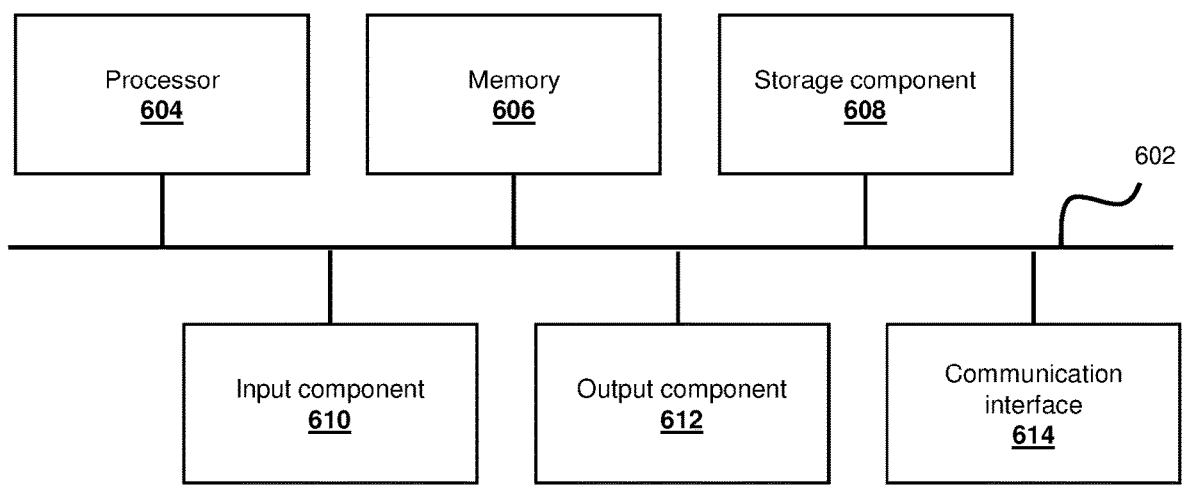
FIG. 6 is a diagram of a non-limiting aspect or embodiment of components of one or more devices and/or one or more systems of FIG. 1.

Referring now to FIG. 6, illustrated is a diagram of example components of device 600. Device 600 may correspond to one or more devices transaction service provider system 102, database 104, user device 106, user devices 108-1-108-n, merchant system 110, issuer system 112, and/or communication network 114. In some non-limiting embodiments or aspects, one or more devices of transaction service provider system 102, one or more devices of database 104, one or more devices of user device 106, one or more devices of user devices 108-1-108-n, one or more devices of merchant system 110, one or more devices of issuer system 112, and/or one or more devices of communication network 114 may include at least one device 600 and/or at least one component of device 600. As shown in FIG. 6, device 600 may include bus 602, processor 604, memory 606, storage component 608, input component 610, output component 612, and communication interface 614.

Bus 602 may include a component that permits communication among the components of device 600. In some non-limiting embodiments or aspects, processor 604 may be implemented in hardware, software, or a combination of hardware and software. For example, processor 604 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 606 may include random access memory (RAM), read-only memory (ROM), and/or another type of dynamic or static storage device (e.g., flash memory, magnetic memory, optical memory, etc.) that stores information and/or instructions for use by processor 604.

Storage component 608 may store information and/or software related to the operation and use of device 600. For example, storage component 608 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 610 may include a component that permits device 600 to receive information, such as via user input (e.g., a touchscreen display, a keyboard, a keypad, a mouse, a button, a switch, a microphone, a camera, etc.). Additionally or alternatively, input component 610 may include a sensor for sensing information (e.g., a global positioning system (GPS) component, an accelerometer, a gyroscope, an actuator, etc.). Output component 612 may include a component that provides output information from device 600 (e.g., a display, a speaker, one or more light-emitting diodes (LEDs), etc.).

Communication interface 614 may include a transceiver-like component (e.g., a transceiver, a separate receiver and transmitter, etc.) that enables device 600 to communicate with other devices, such as via a wired connection, a wireless connection, or a combination of wired and wireless connections. Communication interface 214 may permit device 600 to receive information from another device and/or provide information to another device. For example, communication interface 614 may include an Ethernet interface, an optical interface, a coaxial interface, an infrared interface, a radio frequency (RF) interface, a universal serial bus (USB) interface, a WiFi® interface, a cellular network interface, and/or the like.

Device 600 may perform one or more processes described herein. Device 600 may perform these processes based on processor 604 executing software instructions stored by a computer-readable medium, such as memory 606 and/or storage component 608. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 606 and/or storage component 608 from another computer-readable medium or from another device via communication interface 614. When executed, software instructions stored in memory 606 and/or storage component 608 may cause processor 604 to perform one or more processes described herein. Additionally or alternatively, hardwired circuitry may be used in place of or in combination with software instructions to perform one or more processes described herein. Thus, embodiments or aspects described herein are not limited to any specific combination of hardware circuitry and software.

Memory 606 and/or storage component 608 may include data storage or one or more data structures (e.g., a database, and/or the like). Device 600 may be capable of receiving information from, storing information in, communicating information to, or searching information stored in the data storage or one or more data structures in memory 606 and/or storage component 608. For example, the information may include encryption data, input data, output data, transaction data, account data, or any combination thereof.

The number and arrangement of components shown in FIG. 6 are provided as an example. In some non-limiting embodiments or aspects, device 600 may include additional components, fewer components, different components, or differently arranged components than those shown in FIG. 6. Additionally or alternatively, a set of components (e.g., one or more components) of device 600 may perform one or more functions described as being performed by another set of components of device 600.

Although the present disclosure has been described in detail for the purpose of illustration based on what is currently considered to be the most practical and preferred embodiments, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method, comprising:
    establishing, with at least one processor, a secret key for communication between a plurality of user devices, the plurality of user devices comprising a first user device associated with a requesting user and a second user device associated with a second user, wherein at least one server computer does not have access to the secret key;
    receiving, with the at least one server computer, from the first user device, a split-payment request message comprising encrypted data including a first value and a second value, wherein the encrypted data included in the split-payment request message is encrypted based on the secret key;
    generating, with the at least one server computer, an encrypted balance for the requesting user and the second user based on the encrypted data of the split-payment request message; and
    transmitting, with the at least one server computer, to the second user device, a split-payment confirmation message including the encrypted balance for the requesting user and/or the second user.

2. The computer-implemented method of claim 1, further comprising:
    receiving, with the at least one server computer, from the second user device, a split-payment confirmation response message comprising second encrypted data, the second encrypted data including an indication that the first value and/or the second value is approved;
    generating, with the at least one server computer, an updated encrypted balance for the requesting user and the second user based on the encrypted balance for the requesting user and the second user and the second encrypted data of the split-payment confirmation response message; and
    transmitting, with the at least one server computer, to the first user device, a split-payment response message comprising the updated encrypted balance for the requesting user and the second user.

3. The computer-implemented method of claim 1-2, further comprising:
    receiving, with the at least one server computer, from the second user device, a split-payment message comprising a null value associated with a transaction that does not modify the first value and the second value;
    generating, with the at least one server computer, an updated encrypted balance for the requesting user and the second user based on data of the split-payment confirmation message, wherein the updated encrypted balance does not modify the encrypted balance for the requesting user and the second user; and
    transmitting, with the at least one server computer, to the first user device, a split-payment response message comprising the updated encrypted balance for the requesting user and the second user.

4. The computer-implemented method of claim 2, wherein the split-payment confirmation response message is received after a random interval of time has elapsed from a point in time when the split-payment confirmation message was transmitted to the second user device.

5. The computer-implemented method of claim 1, wherein generating the encrypted balance for the requesting user and the second user based on the encrypted data of the split-payment request message comprises:
    generating, with the at least one server computer, the encrypted balance for the requesting user and the second user based on the encrypted data of the split-payment request message and an additive homomorphic cryptographic algorithm.

6. The computer-implemented method of claim 1, further comprising:
generating, with the at least one server computer, at least one checksum value based on the data of the split-payment confirmation message and/or the encrypted balance for the requesting user and the second user; and
transmitting, with the at least one server computer, the at least one checksum value to the first user device and/or the second user device.

7. The computer-implemented method of claim 1, further comprising:
receiving, with the at least one server computer, from the second user device, a split-payment confirmation response message comprising second encrypted data, the second encrypted data including an indication that the first value and/or the second value is not approved;
in response to receiving the indication, generating, with the at least one server computer, an updated encrypted balance for the requesting user and the second user based on the encrypted balance for the requesting user and the second user and the second encrypted data of the split-payment confirmation response message, wherein the updated encrypted balance corresponds to an initial encrypted balance established prior to the generation of the encrypted balance; and
transmitting, with the at least one server computer, to the first user device, a split-payment response message comprising the updated encrypted balance for the requesting user and the second user.

8. A system, comprising:
at least one processor programmed or configured to:
receive, from a first user device associated with a requesting user, a split-payment request message comprising encrypted data associated with a value for a split-payment transaction, the encrypted data included in the split-payment request message encrypted based at least in part on at least one secret key, wherein the at least one secret key is established for communication between a plurality of user devices, and wherein at least one server computer does not have access to the at least one secret key;
generate an encrypted balance for at least one responding user of a plurality of responding users based on the encrypted data of the split-payment request message; and
transmit at least one split-payment confirmation message to at least one user device of the plurality of user devices, the split-payment confirmation message including the encrypted balance for the requesting user and/or the at least one responding user.

9. The system of claim 8, wherein the at least one processor is further programmed or configured to:
receive, from at least one second user device of a plurality of second user devices, a split-payment confirmation response message comprising second encrypted data, the second encrypted data including an indication that the split-payment transaction is approved by the at least one responding user associated with the encrypted balance;
generate an updated encrypted balance for the requesting user and the at least one responding user associated with the encrypted balance that approved the split-payment transaction based on the encrypted balance for the requesting user and the at least one responding user that accepted the split-payment transaction; and
transmit, to the first user device, a split-payment response message comprising the updated encrypted balance for the requesting user and/or the at least one responding user that approved the split-payment transaction.

10. The system of claim 9, wherein the at least one processor is further programmed or configured to:
in response to transmitting the at least one split-payment confirmation message to the at least one user device of the plurality of user devices, receive, from another second user device of the plurality of second user devices, a split-payment message comprising a null value associated with a transaction that does not modify the value for the split-payment transaction,
wherein generating the updated encrypted balance for the requesting user and the at least one responding user that approved the split-payment transaction is based on data of the split-payment confirmation message, and
wherein, when generating the updated encrypted balance for the requesting user and the at least one responding user that approved the split-payment transaction, the data of the split-payment confirmation message does not cause the at least one processor to modify the encrypted balance for the requesting user and the at least one responding user that accepted the split-payment transaction.

11. The system of claim 9, wherein the split-payment confirmation response message is received after a random interval of time has elapsed from a point in time when the split-payment confirmation message was transmitted to the at least one user device of the plurality of user devices.

12. The system of claim 8, wherein, when generating the encrypted balance for the at least one responding user of the plurality of responding users based on the encrypted data of the split-payment request message, the at least one processor is programmed or configured to:
generate the encrypted balance for at least one responding user of the plurality of responding users based on the encrypted data of the split-payment request message and an additive homomorphic cryptographic algorithm.

13. The system of claim 8, wherein the at least one processor is further programmed or configured to:
generate at least one checksum value based on the data of the split-payment confirmation message and/or the encrypted balance for the requesting user and the at least one responding user that approved the split-payment transaction; and
transmit the at least one checksum value to one or more user devices of the plurality of user devices.

14. The system of claim 8, wherein the at least one processor is further programmed or configured to:
receive, from the at least one second user device associated with the at least one responding user, a split-payment confirmation response message comprising second encrypted data, the second encrypted data including an indication that the split-payment transaction is not approved;
in response to receiving the indication, generate an updated encrypted balance for the requesting user and the at least one responding user that did not approve the split-payment transaction based on the encrypted balance for the requesting user and the at least one responding user that did not approve the split-payment transaction and the second encrypted data of the split-payment confirmation response message, wherein the updated encrypted balance corresponds to an initial encrypted balance established prior to the generation of the encrypted balance; and
transmit, to the first user device, a split-payment response message comprising the updated encrypted balance for the requesting user and the at least one responding user that did not approve the split-payment transaction.

15. A computer-program product comprising at least one non-transitory computer-readable medium including one or more instructions that, when executed by at least one processor, cause the at least one processor to:
    establish at least one secret key for communication between a plurality of user devices, the plurality of user devices comprising a first user device associated with a requesting user and a plurality of second user devices associated with a plurality of responding users, wherein at least one server computer does not have access to the at least one secret key;
    receive, from the first user device, a split-payment request message comprising encrypted data associated with a value for a split-payment transaction, the encrypted data included in the split-payment request message encrypted based at least in part on the secret key;
    generate an encrypted balance for at least one responding user of the plurality of responding users based on the encrypted data of the split-payment request message and an additive homomorphic cryptographic algorithm; and
    transmit at least one split-payment confirmation message to at least one user device of the plurality of user devices, the split-payment confirmation message including the encrypted balance for the requesting user and/or the at least one responding user.

16. The computer-program product of claim 15, wherein the one or more instructions further cause the at least one processor to:
    receive, from at least one second user device of the at least one responding user associated with the encrypted balance, a split-payment confirmation response message comprising second encrypted data, the second encrypted data including an indication that the split-payment transaction is approved by the at least one responding user associated with the encrypted balance;
    generate an updated encrypted balance for the requesting user and the at least one responding user associated with the encrypted balance that approved the split-payment transaction based on the encrypted balance for the requesting user and the at least one responding user that accepted the split-payment transaction; and
    transmit, to the first user device, a split-payment response message comprising the updated encrypted balance for the requesting user and/or the at least one responding user that approved the split-payment transaction.

17. The computer-program product of claim 16, wherein the one or more instructions further cause the at least one processor to:
    in response to transmitting the at least one split-payment confirmation message to the at least one user device of the plurality of user devices, receive, from another second user device of the plurality of second user devices, a split-payment message comprising a null value associated with a transaction that does not modify the value for the split-payment transaction,
    wherein generating the updated encrypted balance for the requesting user and the at least one responding user that approved the split-payment transaction is based on data of the split-payment confirmation message, and
    wherein, when generating the updated encrypted balance for the requesting user and the at least one responding user that approved the split-payment transaction, the data of the split-payment confirmation message does not cause the at least one processor to modify the encrypted balance for the requesting user and the at least one responding user that accepted the split-payment transaction.

18. The computer-program product of claim 16, wherein the split-payment confirmation response message is received after a random interval of time has elapsed from a point in time when the split-payment confirmation message was transmitted to the at least one user device of the plurality of user devices.

19. The computer-program product of claim 15, wherein the one or more instructions further cause the at least one processor to:
    generate at least one checksum value based on the data of the split-payment confirmation message and/or the encrypted balance for the requesting user and the at least one responding user that approved the split-payment transaction; and
    transmit the at least one checksum value to one or more user devices of the plurality of user devices.

20. The computer-program product of claim 15, wherein the one or more instructions further cause the at least one processor to:
    receive, from at least one second user device associated with the at least one responding user, a split-payment confirmation response message comprising second encrypted data, the second encrypted data including an indication that the split-payment transaction is not approved;
    in response to receiving the indication, generate an updated encrypted balance for the requesting user and the at least one responding user that did not approve the split-payment transaction based on the encrypted balance for the requesting user and the at least one responding user that did not approve the split-payment transaction and the second encrypted data of the split-payment confirmation response message, wherein the updated encrypted balance corresponds to an initial encrypted balance established prior to the generation of the encrypted balance; and
    transmit, to the first user device, a split-payment response message comprising the updated encrypted balance for the requesting user and the at least one responding user that did not approve the split-payment transaction.

* * * * *